(12) United States Patent
Ohkawa

(10) Patent No.: US 10,507,615 B2
(45) Date of Patent: Dec. 17, 2019

(54) INFORMATION PROCESSING APPARATUS, COMPUTER READABLE MEDIUM STORING INFORMATION PROCESSING PROGRAM, AND THREE-DIMENSIONAL MODELING SYSTEM

(71) Applicant: FUJI XEROX CO., LTD., Tokyo (JP)

(72) Inventor: Kazuhiro Ohkawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 145 days.

(21) Appl. No.: 15/726,788

(22) Filed: Oct. 6, 2017

(65) Prior Publication Data

US 2018/0200950 A1 Jul. 19, 2018

(30) Foreign Application Priority Data

Jan. 18, 2017 (JP) ................................ 2017-007070

(51) Int. Cl.
*B29C 64/147* (2017.01)
*G06T 17/00* (2006.01)
*B33Y 50/02* (2015.01)
*B33Y 50/00* (2015.01)
*B29C 64/386* (2017.01)

(52) U.S. Cl.
CPC .......... *B29C 64/147* (2017.08); *B29C 64/386* (2017.08); *B33Y 50/00* (2014.12); *B33Y 50/02* (2014.12); *G06T 17/00* (2013.01)

(58) Field of Classification Search
CPC ........ B29C 64/147; B33Y 50/02; G06T 17/00
See application file for complete search history.

(56) References Cited

U.S. PATENT DOCUMENTS

| 6,506,477 B1 | 1/2003 | Ueda et al. | |
| 2005/0225007 A1* | 10/2005 | Lai ..................... | G05B 19/4099 264/308 |
| 2015/0016712 A1* | 1/2015 | Rhoads .............. | G06K 9/00208 382/154 |
| 2017/0341304 A1* | 11/2017 | Miller ................... | B33Y 10/00 |
| 2017/0341305 A1* | 11/2017 | Miller ................ | G05B 19/4099 |

FOREIGN PATENT DOCUMENTS

JP     2000-177016     6/2000

* cited by examiner

*Primary Examiner* — Kenneth M Lo
*Assistant Examiner* — Chad G Erdman
(74) *Attorney, Agent, or Firm* — Fildes & Outland, P.C.

(57) ABSTRACT

An information processing apparatus includes a setting unit that sets, as an attribute to be used for manufacture of a 3D modeled object, an attribute of a 2D image to be used for forming the 2D image on a recording medium, when the 3D modeled object is manufactured by laminating recording media together.

14 Claims, 18 Drawing Sheets

INFORMATION PROCESSING APPARATUS, COMPUTER READABLE MEDIUM STORING INFORMATION PROCESSING PROGRAM, AND THREE-DIMENSIONAL MODELING SYSTEM

CROSS-REFERENCE TO RELATED APPLICATIONS

This application is based on and claims priority under 35 USC 119 from Japanese Patent Application No. 2017-007070 filed on Jan. 18, 2017.

BACKGROUND

The present invention relates to an information processing apparatus, a computer readable medium storing an information processing program, and a three-dimensional modeling system.

SUMMARY

According to an aspect of the invention, there is provided an information processing apparatus comprising a setting unit that sets, as an attribute to foe used for manufacture of a 3D modeled object, an attribute of a 2D image to foe used for forming the 2D image on a recording medium, when the 3D modeled object is manufactured by laminating recording media together.

BRIEF DESCRIPTION OF THE DRAWINGS

Exemplary embodiments of the present invention will be described in detail based on the following figures, wherein.

DESCRIPTION OF SYMBOLS

10 . . . Information processing apparatus; 12 . . . Image forming apparatus; 14 . . . 3D modeling post-processing apparatus (post-processing apparatus); 16 . . . Storing mechanism; 18 . . . Communication line; 20 . . . Glue applying unit; 22 . . . Cutting-out unit; 24 . . . Compression bonding unit; 26 . . . Conveyance path; 30 . . . Information processing unit; 30A . . . CPU; 31 . . . External apparatus; 32 . . . Operation unit; 34 . . . Display; 36 . . . Communication unit; 38 . . . Memory; 40 . . . Analysis unit; 41 . . . Attribute setting unit; 42 . . . File format conversion unit; 43 . . . Raster processing unit; 44 . . . Control data generation unit; 45 . . . Control data memory; 50 . . . Recording medium; 50A . . . Base recording medium; 52 . . . Lamination component; 53 . . . Unnecessary portion; 54 . . . Cutting line; 56 . . . Colored region; 58 . . . Glue application region; 66 . . . 2D image data; 68 . . . Height specifying page; P . . . 3D modeled object; Q . . . Medium-born modeled object.

DETAILED DESCRIPTION

Exemplary embodiments of the present invention will be hereinafter described in detail with reference to the drawings. Constituent elements or steps having the same function will be given the same reference symbol throughout the drawings and will not be described redundantly.

Exemplary Embodiment 1

(Three-Dimensional Modeling System: Overall Configuration)

First, a three-dimensional (3D) modeling system according to a first exemplary embodiment of the invention will be described.

The 3D modeling system according to the first exemplary embodiment forms images on respective recording media by, for example, electrophotography when receiving two-dimensional (2D) image data, and manufactures a three-dimensional (3D) modeled object by a sheet lamination 3D modeling method when receiving three-dimensional (3D) data.

In the sheet lamination 3D modeling method, plural pieces of slice data are generated by slicing three-dimensional (3D) data of a 3D model by plural planes and a series of slice images is formed on plural sheet-like recording media such as paper sheets on the basis of the plural pieces of slice data. Then 3D modeling post-processing is performed on the plural recording media on which the series of slice images is formed; for example, the plural recording media are laminated by subjecting them to certain processing. The term "series of slice images" means that the slice images correspond to the respective pieces of slice data generated on the basis of the 3D data.

Figure 1A:
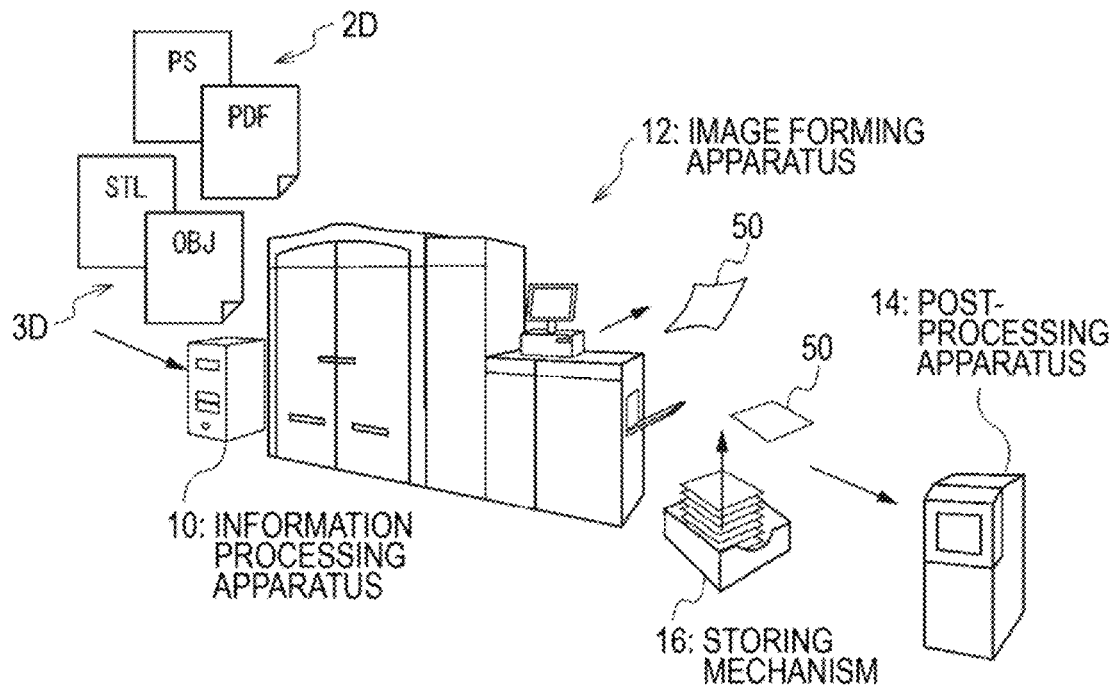
FIGS. 1A and 1B are a schematic diagram and a block diagram, respectively, outlining the configuration of one example 3D modeling system according to a first exemplary embodiment of the present invention.
Figure 1B:
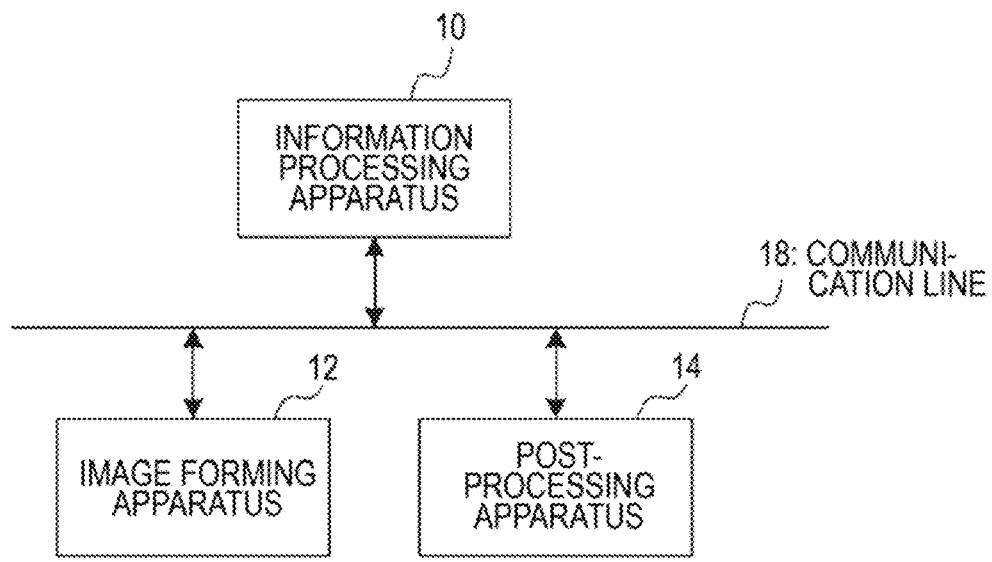
Figure 2:
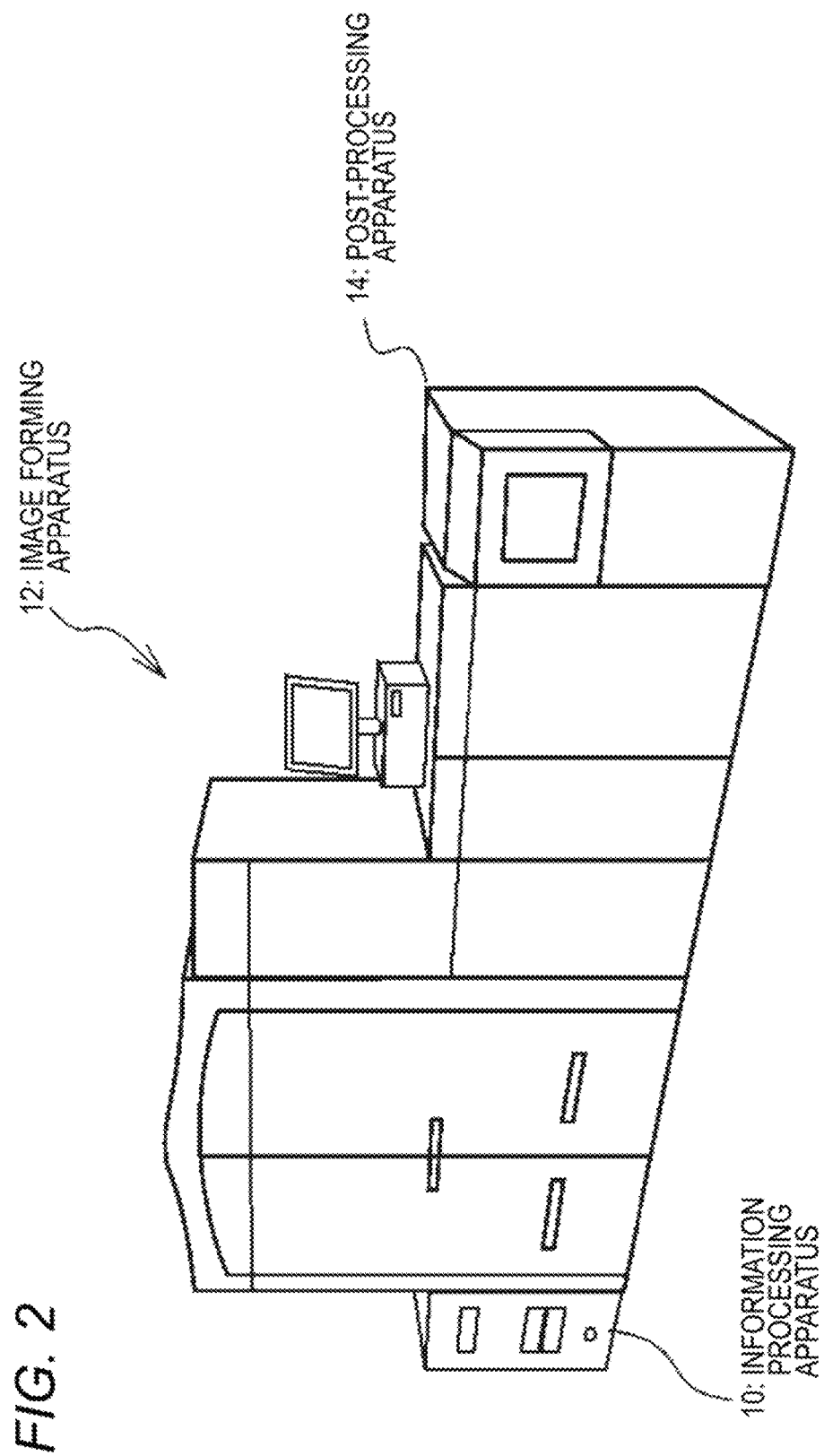
FIG. 2 is a schematic diagram outlining the configuration of another example 3D modeling system according to the first exemplary embodiment.

FIGS. 1A and 1B are a schematic diagram and a block diagram, respectively, illustrating the configuration of one example 3D modeling system according to the first exemplary embodiment. FIG. 2 is a schematic diagram showing the configuration of another example 3D modeling system according to the first exemplary embodiment.

As shown in FIG. 1A, the one example 3D modeling system according to the first exemplary embodiment is equipped with an information processing apparatus 10, an image forming apparatus 12, and a 3D modeling post-processing apparatus 14. As shown in FIG. 1B, the information processing apparatus 10, the image forming apparatus 12, and the 3D modeling post-processing apparatus 14 are connected to each other so as to be able to communicate with each other through a communication line 18. In the following description, the 3D modeling post-processing apparatus 14 will be abbreviated as a "post-processing apparatus 14."

The image forming apparatus 12 forms an image on a recording medium 50 on the basis of raster image data. In the first exemplary embodiment, the image forming apparatus 12 is not an apparatus dedicated to 3D modeling. The image forming apparatus 12 functions as an ordinary image forming apparatus when it is instructed to perform image formation base on two-dimensional (2D) image data. As such, the information processing apparatus 10 performs different kinds of information processing depending on which of image formation based on 2D image data and 3D modeling based on 3D data it should work for.

The image forming apparatus 12 is an apparatus for forming an image on a recording medium by electrophotography, for example. In this case, the image forming apparatus 12 includes a photoreceptor drum, a charging device, an exposing device, a developing device, a transfer device, a fusing device, etc. The charging device charges the photoreceptor drum. The exposing device exposes the charged surface of the photoreceptor drum to light that reflects an image to be formed. The developing device develops, with toner, an electrostatic latent image formed on the photoreceptor drum by the exposure. The transfer device transfers a toner image formed on the photoreceptor drum by exposure to a recording medium. The fusing device fuses the toner image transferred to the recording medium. The image forming apparatus 12 may be an inkjet recording apparatus, in which case the image forming apparatus 12 includes an inkjet recording head for ejecting ink droplets toward a recording medium according to an image to be formed and other components.

If instructed to work for manufacture of a 3D modeled object based on 3D data, the information processing apparatus 10 generates plural pieces of slice data on the basis of the 3D data. Then, to enable formation of a series of raster images, the information processing apparatus 10 generates a series of raster image data from the plural pieces of slice data and outputs the generated series of raster image data to the image forming apparatus 12. On the other hand, if instructed to work for formation 2D images based on 2D image data, the information processing apparatus 10 generates raster image data from the 2D image data for formation of 2D images and outputs the generated raster image data to the image forming apparatus 12.

If instructed to work for manufacture of a 3D modeled object based on 3D data, the information processing apparatus 10 further generates a series of control data on the basis of the plural pieces of slice data. The series of control data is data for allowing the post-processing apparatus 14 to perform 3D modeling post-processing. As described later, control data include control data that specify a cutting line along which to cut out a lamination component from a recording medium and control data that specify a glue application region where glue is applied to the recording medium.

The post-processing apparatus 14 performs 3D modeling post-processing on recording media 50 on which a series of slice images are formed. As shown in FIG. 1A, the post-processing apparatus 14 may be disposed so as not to share a recording medium conveyance path with the image forming apparatus 12 (offline or near-line). Alternatively, as shown in FIG. 2, the post-processing apparatus 14 may be disposed so as to share a recording medium conveyance path with the image forming apparatus 12 (in-line).

Where the post-processing apparatus 14 doss not share a conveyance path with the image forming apparatus 12, plural recording media 50 on which a series of slice images is formed are stacked in order of formation of the slice images and stored in a storing mechanism 16 such as a stacker. The bundle of (i.e., stacked) plural recording media 50 is taken out of the storing mechanism 16 and transferred to the post-processing apparatus 14 together. On the other hand, where the post-processing apparatus 14 shares a conveyance path with the image forming apparatus 12, recording media 50 on which respective slice images are formed are fed to the post-processing apparatus 14 one by one.

The information processing apparatus 10 according to the first exemplary embodiment receives an instruction to manufacture a sheet lamination 3D modeled object on a base recording medium 50A without using 3D data in addition to an ordinary instruction to form 2D images and an ordinary instruction to manufacture a sheet lamination 3D modeled object.

The term "sheet lamination 3D modeled object on a base recording medium 50A" means a 3D modeled object formed on the base recording medium 50A as in the case of a braille panel. In the following description, a 3D modeled object formed on a base recording medium 50A by laminating recording media 50 will be referred to as a "medium-born modeled object Q." It goes without saying that the medium-born modeled object Q is a 3D modeled object. There are no limitations on the shape of the medium-born modeled object Q, that is, it may have any shape. As described later, an instruction to manufacture a sheet lamination 3D modeled object on a base recording medium 50A is input to the information processing apparatus 10 as a 2D image formation instruction.

Figure 3:
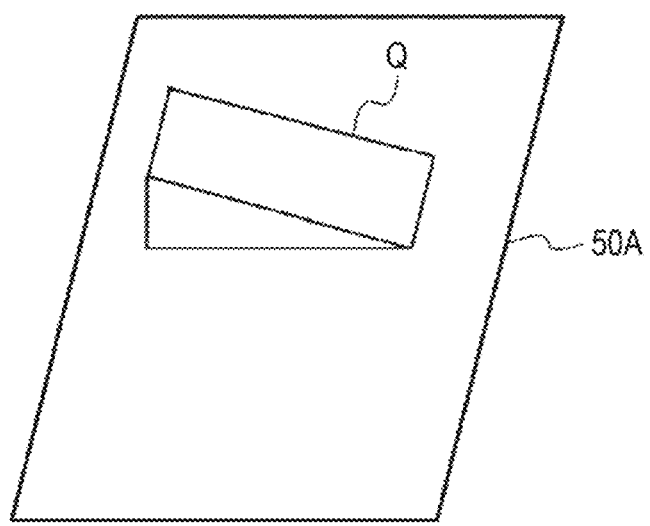
FIG. 3 is a perspective view of an example medium-born modeled object.

FIG. 3 is a perspective view of an example medium-born modeled object Q. The medium-born modeled object Q is formed on a base recording medium 50A by a sheet lamination 3D modeling method described below.

(Sheet Lamination 3D Modeling Method)

Next, individual processes of sheet lamination 3D modeling will be described.

Figure 4A:
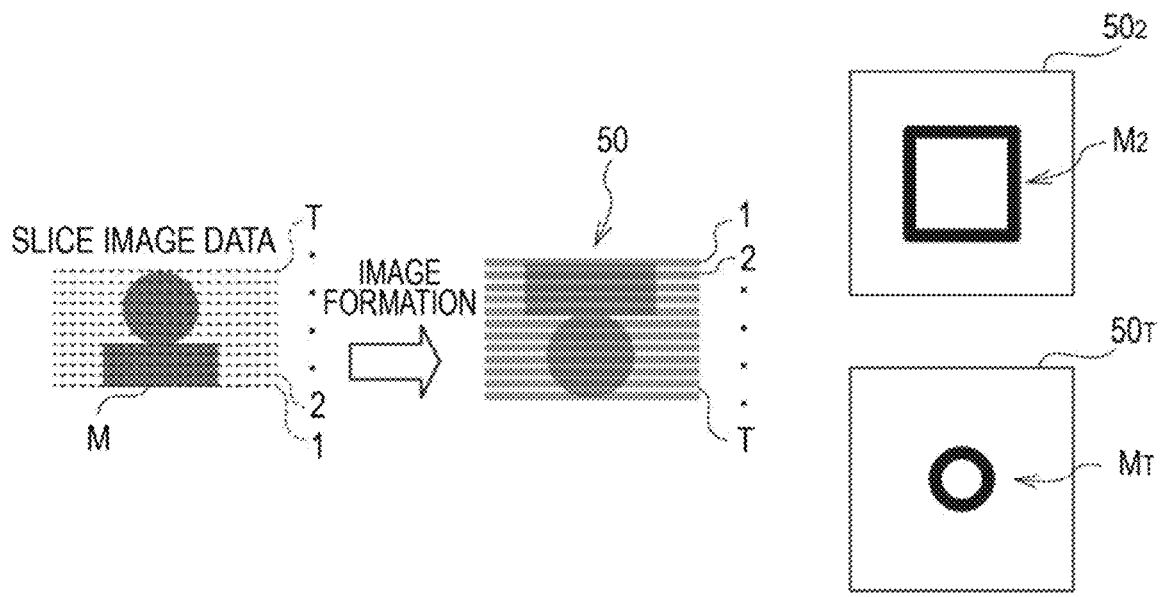
FIGS. 4A and 4B are schematic diagrams illustrating an example sheet lamination 3D modeling process.
Figure 4B:
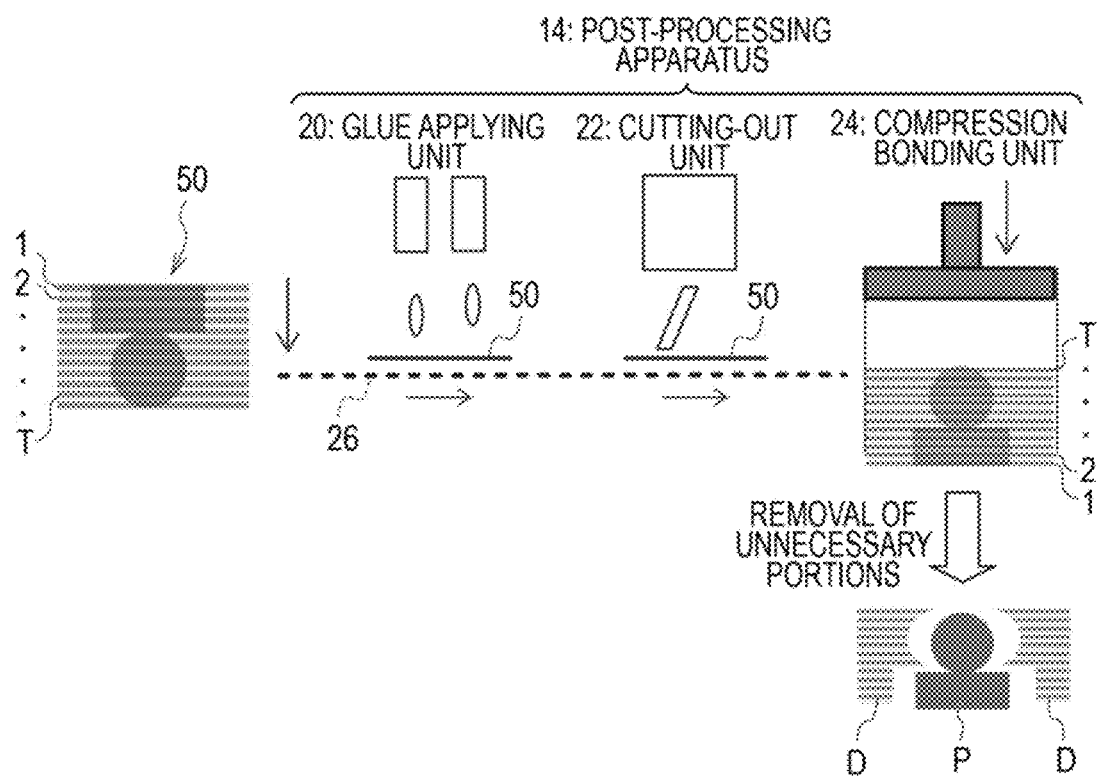

FIG. 4A is a schematic diagram illustrating an image forming process of the sheet lamination 3D modeling using 3D data, and FIG. 4B is a schematic diagram illustrating a post-processing process of the sheet lamination 3D modeling.

First, as shown in FIG. 4A, the information processing apparatus 10 generates plural pieces of slice data on the basis of 3D data of a 3D model M. In the first exemplary embodiment, T (first to Tth) pieces of slice data are generated. Each of the T pieces of slice data is converted into raster image data for formation of a corresponding one of T (first to Tth) slice images.

Next, as shown in FIG. 4A, slice images are formed on respective recording media. The image forming apparatus 12 forms a series of slice images on recording media 50 on the basis of the series of raster image data. The plural recording media $50_1$ to $50_T$ on which the series of slice images is formed are stacked in order of formation of the slice images. An nth slice image is formed on an nth recording medium $50_n$, n being a number that is one of "1" to "T."

In the illustrated example, the T (first to Tth) slice images are formed in order that the number representing each of them descends from "T" to "1." The plural recording media $50_1$ to $50_T$ are stacked in order that the number representing each of them descends from "T" to "1" with the recording medium $50_T$ on which the Tth slice image is formed being the lowest layer. Since the plural recording media $50_1$ to $50_T$ are stacked in this order, the post-processing process that follows is supplied with the plural recording media $50_1$ to $50_T$ in order that the number representing each of them ascends from "1" to "T." As such, the image forming apparatus 12 forms T slice images on recording media 50 in the order that is reverse to the order in which the post-processing apparatus 14 performs post-processing.

Subsequently, as shown in FIG. 4B, the recording media 50 on which the respective slice images are formed are subjected to post processing. In the first exemplary embodiment, the post-processing apparatus 14 is equipped with a glue applying unit 20 which performs a glue applying operation, a cutting-out unit 22 which performs a cutting-out operation, and a compression bonding unit 24 which performs a compression bonding operation. The glue applying unit 20, the cutting-out unit 22, and the compression bonding unit 24 are arranged in this order along a conveyance path 26 for feeding recording media 50. The post-processing apparatus 14 acquires a series of control data corresponding to the series of slice images from the information processing apparatus 10.

The slice image will now be described.

Figure 5A:
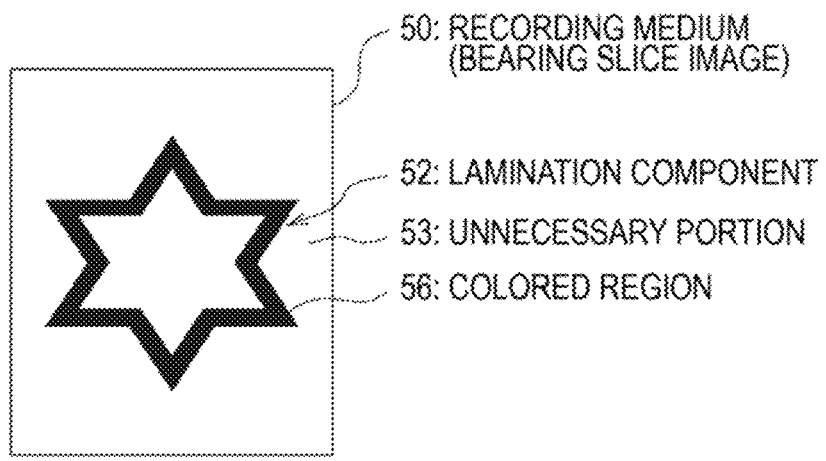
FIGS. 5A, 5B and 5C are schematic diagrams showing an example slice image.
Figure 5B:
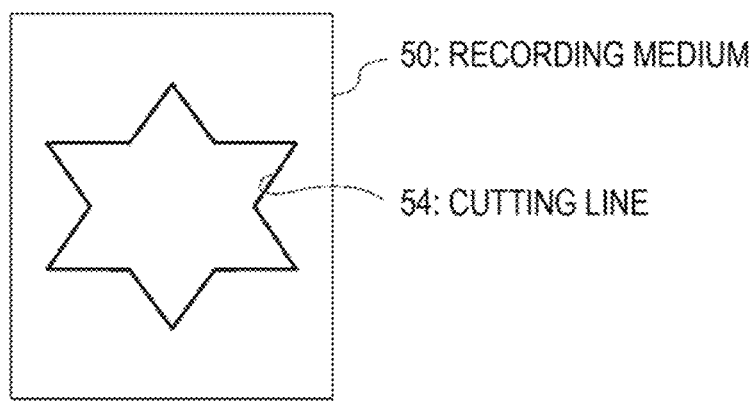
Figure 5C:
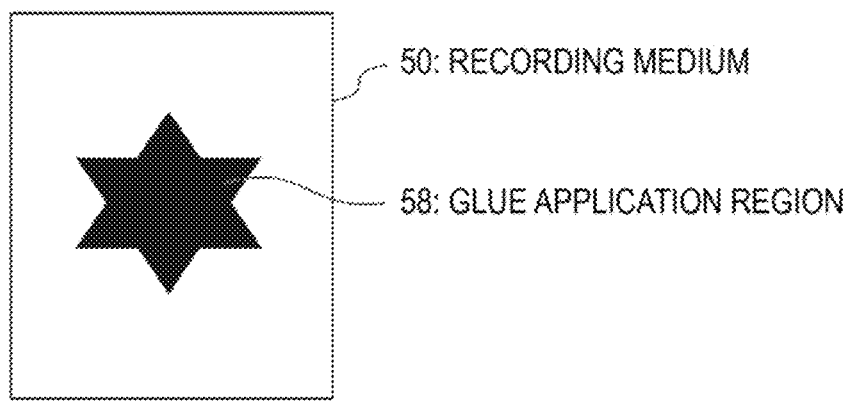

FIGS. 5A, 5B and 5C are schematic diagrams showing an example slice image formed on a recording medium 50. As shown in FIG. 5A, a slice image formed on a recording medium 50 includes a lamination component 52 to become part of a 3D modeled object when subjected to lamination and an unnecessary portion 53. The lamination component 52 has a colored region 56 which is a peripheral region having a preset width. As shown in FIG. 5B, the outer circumferential line of the lamination component 52 is a cutting line 54 along which to cut out the lamination component 52 from the recording medium 50.

As shown in FIG. 5C, a glue application region 58 is set inside the outer circumferential line (cutting line 54) of the lamination component 52; for example, the glue application region 58 is the region located inside and adjoining the colored region 56. Although glue may be applied to the entire surface of the recording medium 50 including the unnecessary portion 53, setting the glue application region 58 as a region located inside the outer circumferential line of the lamination component 52 makes it easier to remove removal target portions D (see FIG. 4B) than in the case that glue is applied to the entire surface of the recording medium 50. Furthermore, setting the glue application region 58 as a region located inside the outer circumferential line of the lamination component 52 prevents an event that glue sticks out of the lamination component 52 in a compression bonding operation that is performed after glue application.

A width of the colored region 56 and a retreat width of the glue application region 58 from the outer circumferential line of the lamination component 52 may be set when a user inputs instructions about 3D modeling by, for example, displaying a setting picture on a display 34 of the information processing apparatus 10 and receiving settings from the user through an operation unit 32. Alternatively, preset initial settings may be employed.

Control data include control data that specify the cutting line 54 and control data that specify the glue application region 58. For example, the control data that specify the cutting line 54 are coordinate data of points located on a route of the cutting line 54. The control data that specify the glue application region 58 are coordinate data of points existing in the glue application region 58.

Recording media 50 are supplied to the glue applying unit 20 one by one from a bundle of plural recording media 50. The glue applying unit 20 applies glue to the glue application region 58 of each recording medium 50 according to control data that specify the glue application region 58. For example, the glue applying unit 20 may be equipped with a glue ejection head for ejecting glue, which is moved in a lamination direction (Z direction) and directions parallel with the plane of the recording medium 50 (X and Y directions). Glue is applied to the glue application region 58 of the recording medium 58 as the glue ejection head scans the glue application region 58 while ejecting glue. Upon completion of the glue applying operation, the recording medium 50 is supplied to the cutting-out unit 22.

The cutting-out unit 22 forms a cut in each recording medium 50 along the cutting line 54 according to control data that specify the cutting line 54. For example, the cutting-out unit 22 may be a cutter having a blade. The blade of the cutter is moved in the lamination direction (Z direction) and the directions parallel with the plane of the recording medium 50 (X and Y directions). A cut is formed in the recording medium 50 by moving the blade of the cutter in the X and Y directions while pressing it against the recording medium 50.

A cutting depth is determined by adjusting the position of the blade of the cutter in the lamination direction. The cutting depth may be such that the cut does not reach the back surface of each recording medium 50, in which case the lamination component 52 is not separated from the recording medium 50 and hence may be prevented from being lost in the process of conveyance of the recording medium 50.

It suffices that the cutter have a function of forming a cut along the cutting line 54 of a recording medium 50, and the cutter is not limited to a mechanical cutter that presses a blade against a recording medium 50. For example, the cutter may be an ultrasonic cutter that forms a cut by applying ultrasonic waves to a recording medium 50 or a laser cutter that forms a cut by irradiating a recording medium 50 with laser light.

Instead of forming a cut in a recording medium 50, the cutting-out unit 22 may form plural perforations in a recording medium 50 along the cutting line 54. Where plural perforations are formed, the lamination component 52 is kept connected to the recording medium 50 and hence may be prevented from being lost in the process of conveyance of the recording medium 50 even more reliably.

Each recording medium 50 that has been subjected to the cutting operation is supplied to the compression bonding unit 24. The compression bonding unit 24 stacks received recording media 50 successively. The plural recording media $50_1$ to $50_T$ are stacked in order that the number representing each of them ascends from "1" to "T." The compression bonding unit 24 compression-bonds the bundle of stacked plural recording media 50 together by pressing it in the lamination direction. During the pressure bonding, each of the plural glue-applied recording media $50_1$ to $50_T$ is bonded to the recording media 50 located immediately above and below in the glue application regions 58.

The recording media 50 that have been subjected to the cutting-out operation are composed of the lamination components 52 that constitute a 3D modeled object P as a result of the lamination and the unnecessary portions 53. In this state, the unnecessary portions 53 are not removed and remain parts of the recording media 50. The unnecessary portions 53 serve as a support member for supporting the 3D modeled object P that is a laminate of the lamination components 52. After completion of the lamination operation of the compression bonding unit 24, removal target portions D are separated from the laminate of the lamination components 52 of the recording media 50, whereby the 3D modeled object P are separated.

The sheet lamination 3D modeling process not using 3D data, that is, the process for manufacturing a medium-born modeled object Q, is different from the sheet lamination 3D modeling process using 3D data in that lamination images are formed on respective recording media 50 on the basis of 2D image data and then laminated together instead of forming slice images on respective recording media 50 on the basis of slice data generated by slicing a 3D model M and laminating them together. Thus, to describe the process for manufacturing a medium-born modeled object Q, terms used in the above description of the sheet lamination 3D modeling "3D data of a 3D model M," "slice data," and "slice images" should be read as "2D image data for a medium-born modeled object Q," "lamination data," and "lamination images," respectively.

The lamination data means data to be used for manufacturing a medium-born modeled object Q by laminating recording media 50 together, and the lamination images mean images that are formed on respective recording media 50 on the basis of the lamination data of respective pages.

A medium-born modeled object Q is formed on a base recording medium 50A (more specifically, recording medium $50_1$) by supplying the compression bonding unit 24 with the base recording medium 50A on which a medium-born modeled object Q is to be formed without forming a cut in it.

Two-dimensional image data are written in a page description language that is used commonly as a data format for describing a 2D image. Thus, in the 3D modeling system according to the first exemplary embodiment, a medium-born modeled object Q which is a 3D modeled object is manufactured on the basis of 2D image data using a process that is equivalent to an image forming process of an ordinary information processing apparatus. A method for generating lamination data from 2D image data will be described later. Data written in a page description language is also called a PDL data.

Since three-dimensional modeling of a 3D model M based on 3D data and 3D modeling of a medium-born modeled object Q based on 2D image data have the common individual processes, the following description of the first exemplary embodiment will be directed to a 3D modeling system for manufacturing a medium-born modeled object Q.

Next, examples of control data will be described.

Figure 6A:
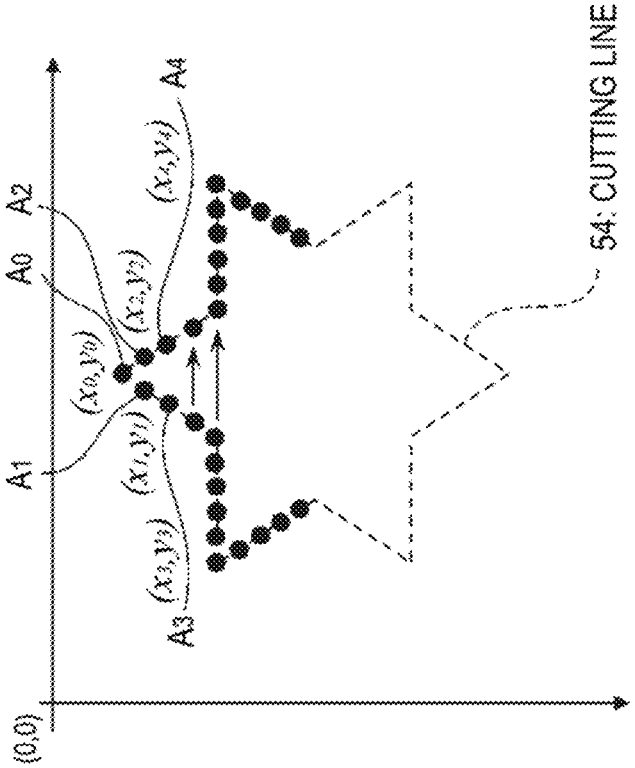
FIGS. 6A and 6B are schematic diagrams showing example control data that specify a cutting line.
Figure 6B:
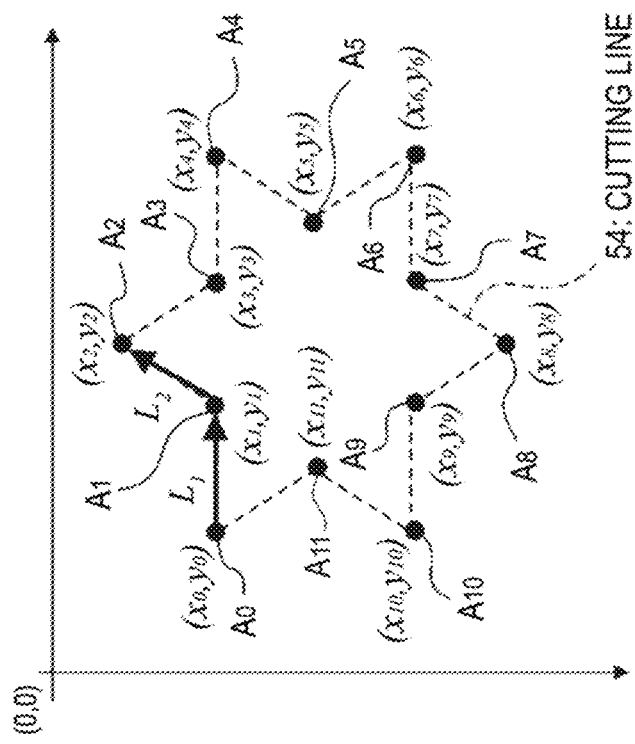
Figure 7A:
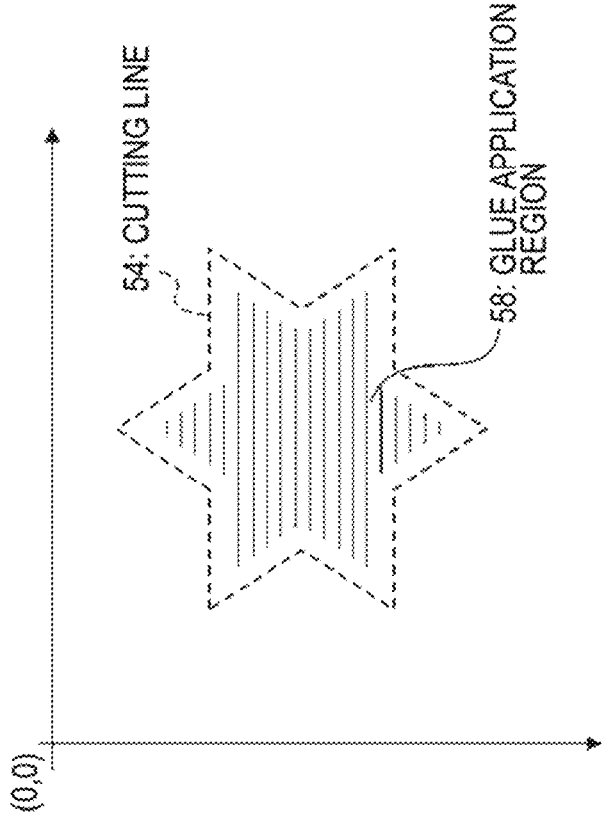
FIGS. 7A and 7B are schematic diagrams showing example control data that specify a glue application region.
Figure 7B:
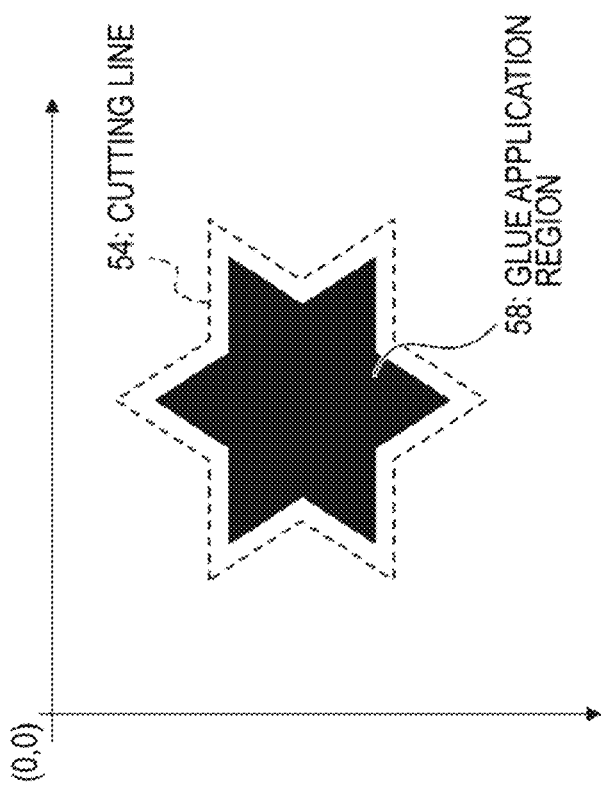

FIGS. 6A and 6B are schematic diagrams illustrating examples of control data that specify a cutting line 54. FIGS. 7A and 7B are schematic diagrams illustrating examples of control data that specify a glue application region 58. As described later, lamination data include coordinate data of apices of intersection regions where polygons intersect a slicing plane. The intersection regions exist along the outer circumferential line of a lamination component 52. Thus, as shown in FIG. 6A, coordinate data of respective points located on the route of a cutting line 54, such as coordinates $(x_0, y_0)$ of point $A_0$, are made control data that specify the cutting line 54.

In the illustrated example, a star-shaped lamination component 52 has twelve apices $A_0$ to $A_{11}$. For example, if point $A_0$ is employed as a start point, the cutting line 54 is specified by tracing the points $A_0$ to $A_{11}$ in order of $A_0 \rightarrow A_2 \rightarrow A_3 \rightarrow A_4 \rightarrow A_5 \rightarrow A_6 \rightarrow A_7 \rightarrow A_8 \rightarrow A_9 \rightarrow A_{10} \rightarrow A_{11}$.

As shown in FIG. 6B, where plural perforations are to be formed, coordinate data of respective perforations located on the route of a cutting line 54 are made control data that specify the cutting line 54. For example, if point $A_0$ is employed as a start point, the cutting line 54 is specified by tracing points of the perforations in order of their formation (e.g., $A_0 \rightarrow A_2 \rightarrow A_3 \rightarrow A_4 \ldots$).

As shown in FIG. 7A, coordinate data of respective points of a glue application region 58 are made control data that specify the glue application region 58. The glue application region 58 is one size smaller than the lamination component 52 and is set inside the outer circumferential line of the lamination component 52. A glue application region 58 may be specified by reducing the image of the lamination component 52. In this case, the glue application region 58 is disposed so that its center of gravity coincides with that of the image of the lamination component 52. Coordinate data of respective points of the glue application region 58 are determined on the basis of its retreat width from the outer circumferential line of the lamination component 52 and coordinate data of points located on the route of the cutting line 54.

As shown in FIG. 7B, it is not necessary to apply glue over the entire glue application region 58. Glue may be applied in selected portions of the glue application region 58. Furthermore, the glue density need not be constant over the entire glue application region 58. Where the glue density is set variable, the glue density may be set higher in a peripheral region of the glue application region 58 than in its central region.

The origin of control data that specify a cutting line 54 and the origin of control data that specify a glue application region 58 are set the same as the origin of lamination image formation. Where the post-processing apparatus 14 has an image reading function, a procedure may be employed that the image forming apparatus 12 forms a mark image indicating the origin of control data on a recording medium 50 together with a lamination image and the post-processing apparatus 14 acquires position information indicating the origin of control data by reading the mark image.

The form of control data is not limited to coordinate data. For example, control data may be image data in which a cutting line 54, a glue application region 58, etc. are represented by figures or images, such as binary raster image data. In the case of binary raster image data, in the example shown in FIG. 5B, the pixel values of the cutting line 54 are made and those of the other regions are made "0." In the example shown in FIG. 5C, the pixel values of the glue application region 58 are made "1" and those of the other regions are made "0." For example, the glue ejection head of the glue applying unit 20 ejects glue toward a recording medium 50 when the pixel value is equal to "1" and does not eject glue toward the recording medium 50 when the pixel value is equal to "0."

(Information Processing Apparatus 10)

Next, the information processing apparatus 10 according to the exemplary embodiment of the invention will be described.

Figure 8:
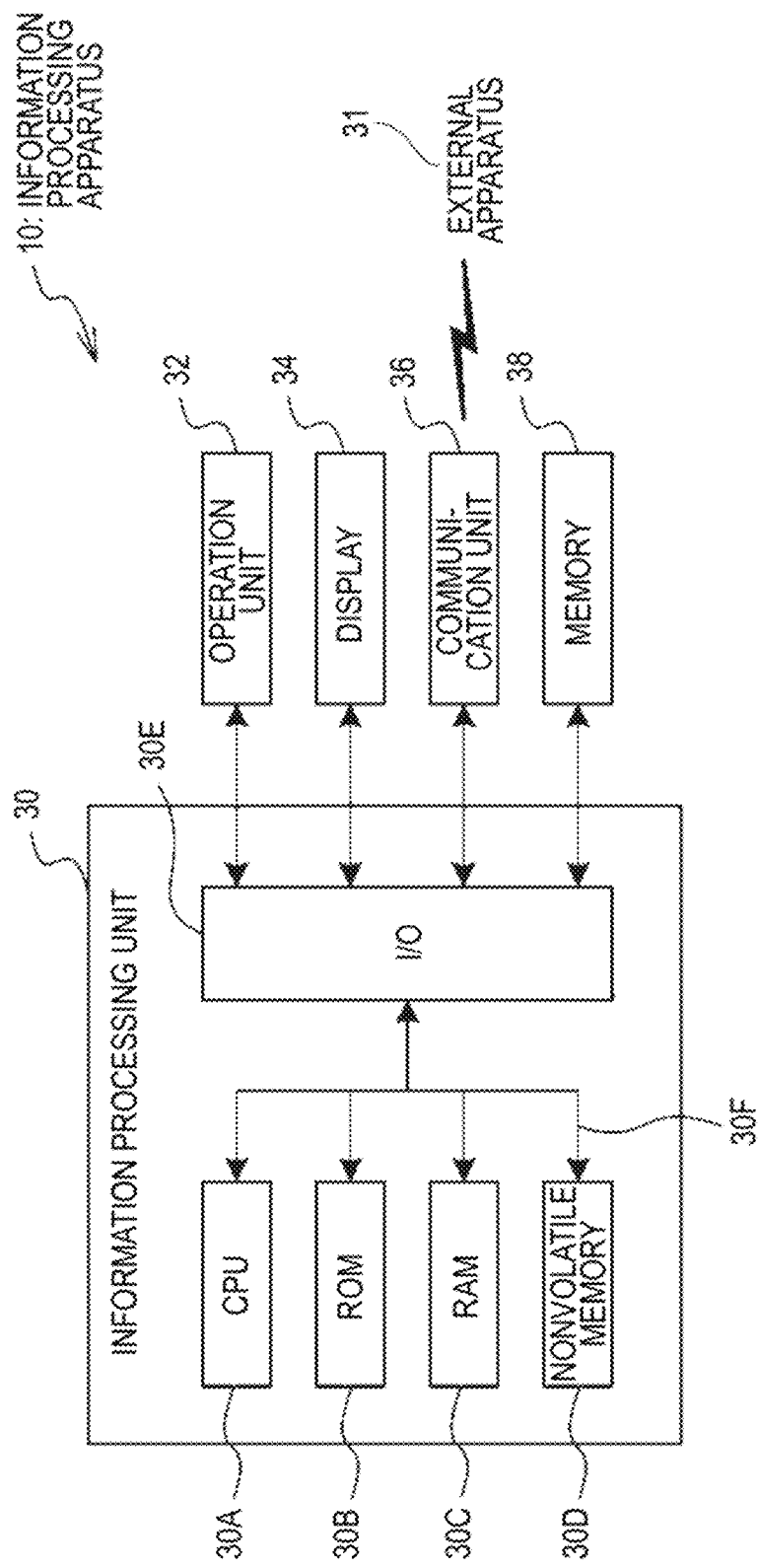
FIG. 8 is a block diagram showing an example configuration of a part of the electrical system of an information processing apparatus.

FIG. 8 is a block diagram showing the electrical configuration of the information processing apparatus 10 according to the exemplary embodiment. As shown in FIG. 8, the information processing apparatus 10 is equipped with an information processing unit 30, an operation unit 32 for receiving a user manipulation, a display 34 for displaying information to a user, a communication unit 36 for communicating with an external apparatus 31, and a memory 38 such as an external storage device. The operation unit 32, the display 34, the communication unit 36, and the memory 38 are connected to an input/output interface (I/O) 30E of the information processing unit 30.

The information processing unit 30 is equipped with a CPU (central processing unit) 30A, a ROM (read-only memory) 30B, a RAM (random access memory) 30C, a nonvolatile memory 30D, and the I/O 30E. The CPU 30A, the ROM 30B, the RAM 30C, the nonvolatile memory 30D, and the I/O 30E are connected to each other by a bus 30F. The CPU 30A reads out a program from the ROM 30B and executes the program using the RAM 30C as a working area.

The operation unit 32 receives a user manipulation through a mouse, a keyboard, etc. The display 34 displays various pictures to a user using a display device. The communication unit 36 communicates with the external apparatus 31 through a wired or wireless communicate line. For example, the communication unit 36 functions as an interface for communicating with the external apparatus 31 such as a computer that is connected to a communication network or line such as a LAN (local area network), a dedicated line, or the Internet. The memory 38 is equipped with a storage device such as a hard disk drive. The operation unit 32 is an example of the "specifying unit".

Figure 9:
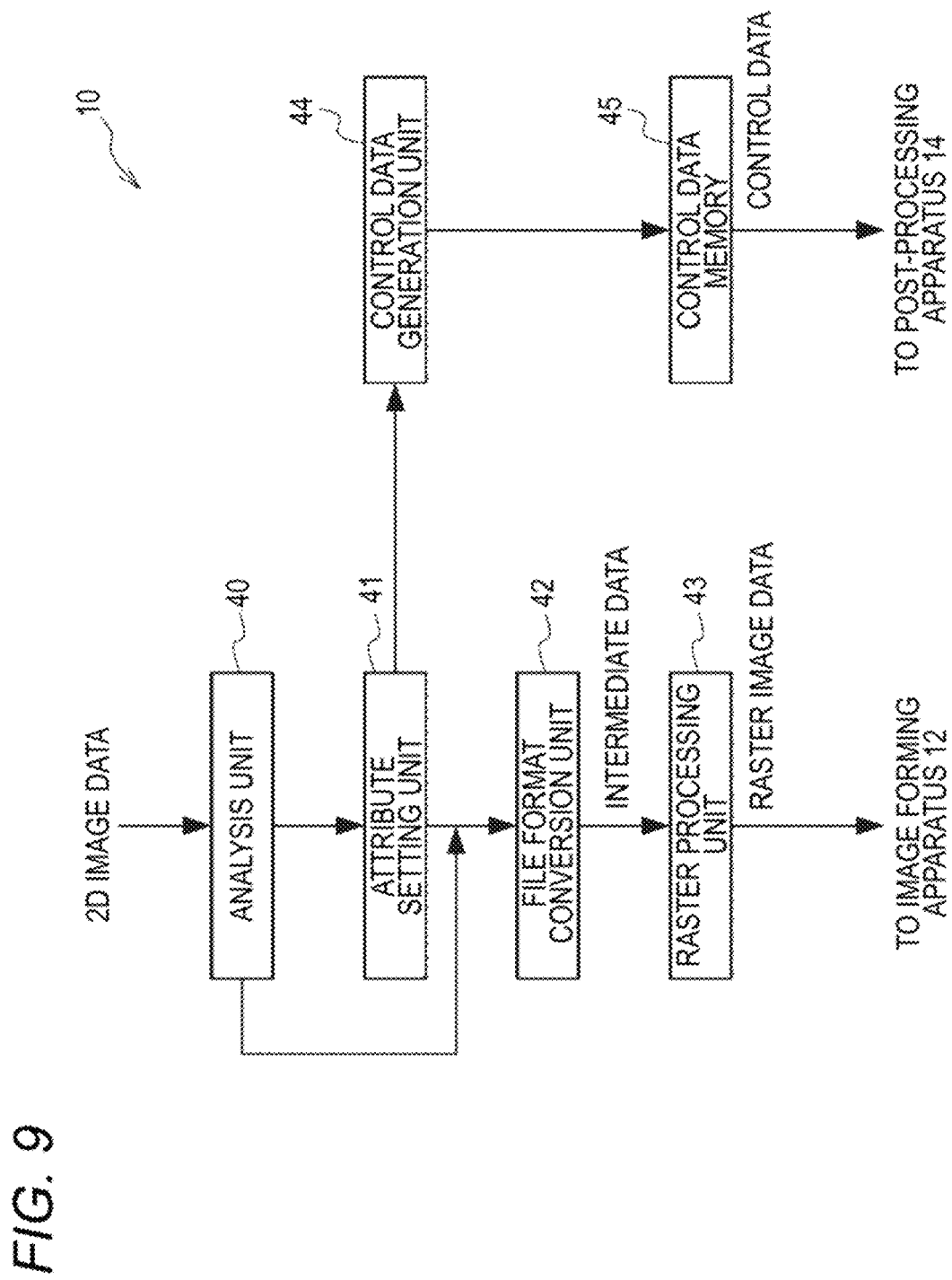
FIG. 9 is a block diagram showing an example functional configuration, relating to manufacture of a medium-born modeled object, of the information processing apparatus.

FIG. 9 is a block diagram showing a functional configuration, relating to manufacture of a medium-born modeled object Q, of the information processing apparatus 10. The information processing apparatus 10 is equipped with, in addition to the functional configuration shown in FIG. 9, a 3D data processing unit (not shown) for receiving 3D data and generating slice data by processing the received 3D data. However, the 3D data processing unit will not be described here.

As shown in FIG. 9, the information processing apparatus 10 is equipped with an analysis unit 40, an attribute setting unit 41, a file format conversion unit 42, a raster processing unit 43, a control data generation unit 44, and a control data memory 45.

When receiving 2D image data, the analysis unit 40 analyzes it to judge whether the 2D image data contain height information. If the 2D image data contain height information, to manufacture a medium-born modeled object Q on the basis of the 2D image data, the analysis unit 40 sends the received 2D image data to the attribute setting unit 41. There are no limitations on the form of height information contained in 2D image data; it suffices that height information be in a predetermined form.

When receiving the 2D image data containing the height information, the attribute setting unit 41 uses, as an attribute (modeling attribute) indicating heights of the medium-born modeled object Q to be manufactured, an attribute that does not affect 2D images to be formed on the basis of the received 2D image data among attributes to be used for 2D image formation. That is, the attribute setting unit 41 specifies a shape of the medium-born modeled object Q to be manufactured by setting height information for an attribute that is prepared in the 2D image data in advance but will not be used. The attribute setting unit 41 sends the 2D image data having the thus-set modeling attribute to the file format conversion unit 42. The attribute setting unit 41 is an example of the "setting unit".

When receiving the 2D image data having the thus-set modeling attribute, the file format conversion unit 42 converts the 2D image data which is PDL data into intermediate data. Since the 2D image data have the attribute indicating the shape and heights of the medium-born modeled object Q to be manufactured, the file format conversion unit 42 generates intermediate data representing lamination data that correspond to the medium-born modeled object Q to be manufactured and sends the generated intermediate data to the raster processing unit 43.

The intermediate data are interval data produced by dividing each of objects (e.g., font characters, graphic figures, and image data) that are image elements of each page image into intervals of respective raster scanning lines. Each piece of interval data includes sets of coordinates of the two ends of the interval concerned and pieces of information indicating pixel values of respective pixels in the interval. The data transfer rate in the information processing apparatus 10 may be increased because the PDL data, are converted into the intermediate data and then the latter are transferred.

The modeling attribute is not an attribute that is provided additionally to form the medium-born modeled object Q but an attribute that is prepared in advance for 2D image formation. Thus, the file format conversion unit 42 generates intermediate data corresponding to the medium-born modeled object Q to be manufactured by interpreting the meaning of the modeling attribute as a meaning that is different from its original meaning. In this manner, the file format conversion unit 42 generates intermediate data corresponding to the medium-born modeled object Q to be manufactured using a process that is equivalent to a process for converting 2D image data into intermediate data. The file format conversion unit 42 is an example of the "conversion unit".

When receiving the intermediate data, the raster processing unit 43 generates raster image data by rasterizing the intermediate data. The generated raster image data are sent to the image forming apparatus 12, which forms lamination images on respective recording media 50 on the basis of the raster image data (see FIG. 4A).

The attribute setting unit 41 sends the 2D image data having the thus-set modeling attribute to the control data generation unit 44. When receiving the 2D image data having the thus-set modeling attribute, the control data generation unit 44 generates control data that specify cutting lines 54 and glue application regions 58 (described above) according to the shape of the medium-born modeled object Q to be manufactured that is indicated by the received 2D image data.

The generated control data are stored in the control data memory 45 so as to be correlated with respective numbers indicating lamination order of lamination images. When the information processing apparatus 10 receives an instruction to start post-processing from a user, the control data are read out from the control data memory 45 and output to the post-processing apparatus 14.

On the other hand, if receiving 2D image data that do not contain height information, the analysis unit 40 sends the received 2D image data to the file format conversion unit 42, which generates raster image data corresponding to the 2D image data. That is, the information processing apparatus 10 performs ordinary image formation processing of forming 2D images on respective recording media 50.

The above-described individual functions of the analysis unit 40, the attribute setting unit 41, the file format conversion unit 42, the raster processing unit 43, and the control data generation unit 44 are performed by the CPU 30A.

Although in the first exemplary embodiment the information processing apparatus 10 is equipped with the control data memory 45, a memory for storing control data may be disposed outside the information processing apparatus 10. For example, the post-processing apparatus 14 may be equipped with a memory for storing control data. In this case, control data generated by the information processing apparatus 10 are stored in the memory of the post-processing apparatus 14 and read out from it when used.

The memory for storing control data may be a computer-readable, portable storage medium such as a USB (Universal Serial Bus) memory. In this case, control data generated by the information processing apparatus 10 are stored in the computer-readable, portable storage medium. The control data stored in this storage medium are read out from it by a data reading mechanism such as a drive provided in the information processing apparatus 10 or the post-processing apparatus 14 and used in the post-processing apparatus 14.

<Information Processing Program>

Next, an information processing program according to the first exemplary embodiment will be described.

Figure 10:
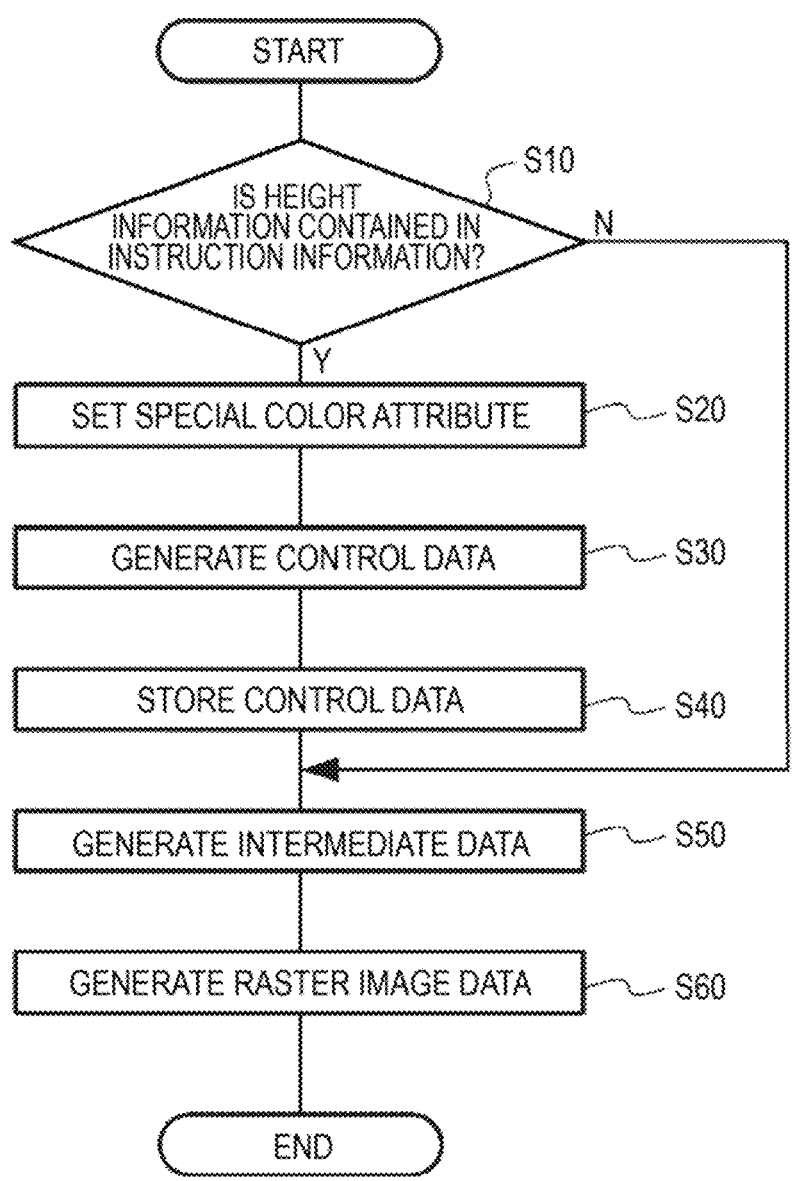
FIG. 10 is a flowchart showing an example processing procedure of an information processing program according to the first exemplary embodiment.

FIG. 10 is a flowchart showing an example processing procedure of the information processing program according to the first exemplary embodiment. The information processing program is stored in the ROM 30B of the information processing apparatus 10. The information processing program is read out from the ROM 30B and executed by the CPU 30A of the information processing apparatus 10 upon reception of a 2D image formation instruction from a user.

The following description will be made with an assumption that 2D image data accommodate special colors. The term "special colors" mean particular colors that are hard to express by mixing fundamental colors (also called process colors) cyan, magenta, yellow, and black that are used for forming a color image. Among applications for generating 2D image data to be input to the information processing apparatus 10 are ones that generate 2D image data containing data representing an object for which a special color(s) is designated.

At step S10, the analysis unit 40 judges whether instruction information that commands formation of a 2D image corresponding to 2D image data on a recording medium 50 contains an instruction that specifies height information for designated special colors. If the instruction information contains an instruction that specifies height information for designated special colors, the CPU 30A executes the process shown in step S20.

At step S20, the attribute setting unit 41 sets heights of a medium-born modeled object Q to be manufactured for an object for which use of special colors is commanded among objects of the 2D image data for formation of a 2D image. In the following description, an attribute that commands use of a special color will be referred to as a "special color attribute."

The attribute setting unit 41 correlates heights that are preset for respective special colors in such a manner that, for example, heights 10 mm and 20 mm are set for special colors $X_1$ and $X_2$, respectively, with the pixels of the object for which use of the special colors is commanded. An object for which a special color is designated that is not correlated with a height may be regarded as being 0 mm in height and printed in a replacement color that corresponds to the special color and obtained by mixing cyan, magenta, yellow, and black. For example, the corresponding relationship between special colors and heights may be stored in the nonvolatile memory 30D in advance.

At step S30, the control data generation unit 44 generates control data by referring to the attribute, set at step S20, of the 2D image data. More specifically, the control data generation unit 44 generates control data that specify the numbers of recording media 50 to be laminated together and cutting lines 54 and glue application regions 58 in the respective recording media 50 on the basis of the heights, specified for the respective pixels, of the medium-born modeled object Q to be manufactured.

At step S40, the control data generation unit 44 stores the control data generated at step S30 in the control data memory 45.

Step S50 is executed after the execution of step S40 or if a negative judgment is made at step S10, that is, the received 2D image data are ordinary 2D image data that do not contain height information.

At step S50, the file format conversion unit 42 converts the 2D image data into intermediate data. In doing so, the file format conversion unit 42 determines the numbers of recording media 50 to be stacked from the heights, specified for the respective pixels, of the medium-born modeled object Q to be manufactured by referring to the attribute of the 2D image data that was set at step S20, and generates intermediate data corresponding to respective recording media 50 to be stacked. Printing will be performed on recording media 50 of the numbers corresponding to the heights of the medium-born modeled object Q to be manufactured on the basis of the 2D image data taking stacking order into consideration.

At step S60, the raster processing unit 43 generates raster image data from the intermediate data generated at step S50 and sends the generated raster image data to the image forming apparatus 12, whereupon the execution of the information processing program shown in FIG. 10 is finished.

The image forming apparatus 12 forms 2D images on the basis of the received raster image data on respective recording media 50. Where the received raster image data are lamination data for manufacture of a medium-born modeled object Q, as shown in FIG. 4A the image forming apparatus 12 outputs plural recording media 50 that will be stacked to a maximum height of the medium-born modeled object Q to be manufactured. By referring to the control data that were stored at step S40, the post-processing apparatus 14 performs post-processing on the stacked recording media 50, that is, performs glue application and cutting on each recording medium 50 so that a medium-born modeled object Q is formed on a base recording medium 50A.

Figure 11A:
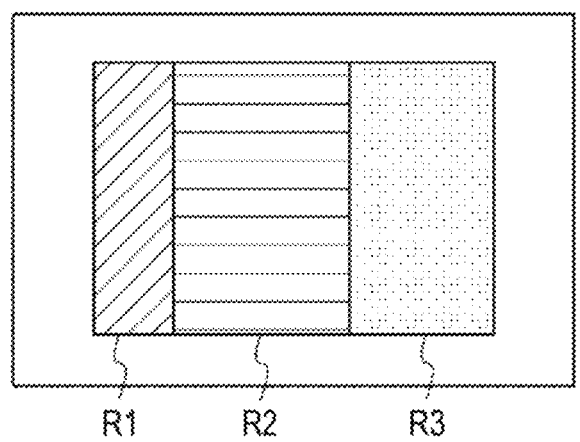
FIGS. 11A and 11B show an example medium-born modeled object manufactured by executing the information processing program according to the first exemplary embodiment.
Figure 11B:
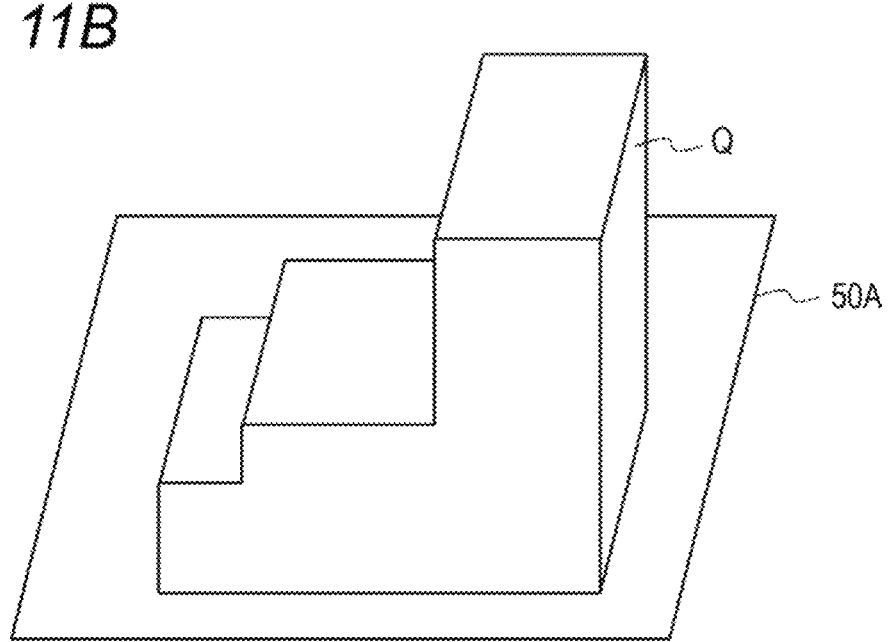

FIGS. 11A and 11B show an example medium-born modeled object Q manufactured by executing the information processing program shown in FIG. 10.

FIG. 11A is a diagram showing example 2D image data in which special color attribute was set at step S20. As shown in FIG. 11A, it is assumed that use of special colors $X_1$, $X_2$, and $X_3$ in regions R1, R2, and R3, respectively, is commanded. If a magnitude relationship (height correlated with special color $X_1$)<(height correlated with special color $X_2$)< (height correlated with special color $X_3$) holds, a medium-born modeled object Q having three different heights is manufactured as shown in FIG. 11B.

Although in the information processing program shown in FIG. 10 heights are correlated with respective special colors, the numbers of recording media 50 to be stacked may be correlated with respective special colors. In this case, the manufacturing time of a medium-born modeled object Q is made shorter than in the case that heights are correlated with respective special colors because the processing of calculating the numbers of recording media 50 to be stacked on the basis of specified heights taking the thickness of each recording medium 50 into consideration may be omitted.

In the first exemplary embodiment the processing for including height information in 2D image data is performed inside the information processing apparatus 10. An alternative configuration is possible in which the processing that is performed by the attribute setting unit 41 in the first exemplary embodiment is performed outside the information processing apparatus 10 and 2D image data containing height information is input to the information processing apparatus 10.

Exemplary Embodiment 2

In the 3D modeling system according to the first exemplary embodiment, a medium-born modeled object Q is manufactured using, as the modeling attribute, the special color attribute of 2D image data. A second exemplary embodiment is directed to a 3D modeling system that manufactures a medium-born modeled object Q using a special color density attribute as the modeling attribute.

The configuration of the 3D modeling system according to the second exemplary embodiment is equivalent to the configuration shown in FIGS. 1A and 1B, and the functional configuration, relating to manufacture of a medium-born modeled object Q, of the information processing apparatus 10 according to the second exemplary embodiment is equivalent to that shown in FIG. 9.

<Information Processing Program>

Next, an information processing program according to the second exemplary embodiment will be described.

Figure 12:
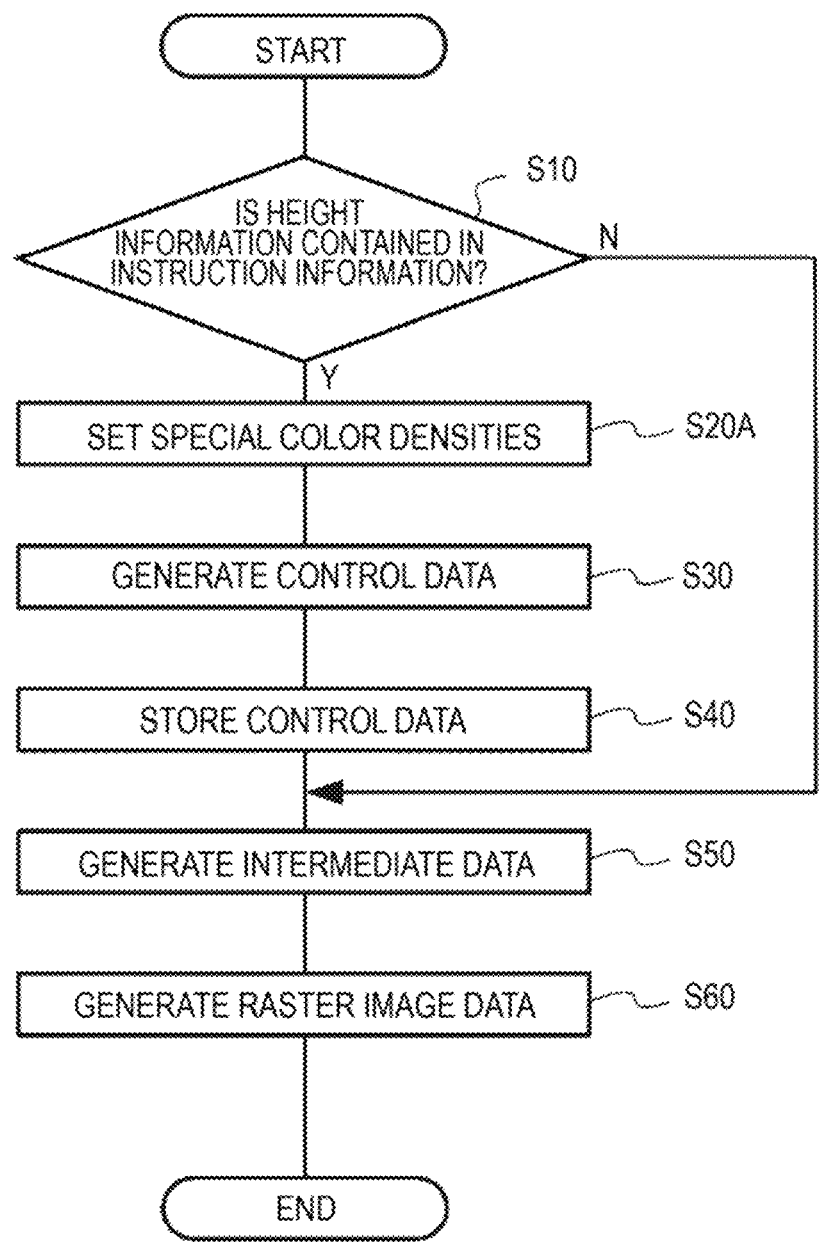
FIG. 12 is a flowchart showing an example processing procedure of an information processing program according to a second exemplary embodiment.

FIG. 12 is a flowchart showing an example processing procedure of the information processing program according to the second exemplary embodiment. The information processing program is stored in the ROM 30B of the information processing apparatus 10. The information processing program is read out from the ROM 30B and executed by the CPU 30A of the information processing apparatus 10 upon reception of a 2D image formation instruction from a user.

The following description will be made with an assumption that 2D image data accommodate special colors but no special colors are used in 2D images.

The information processing program shown in FIG. 12 is different from that according to the first exemplary embodiment in that the former employs step S20A in place of step S20 of the latter. Thus, step S20A will be described below.

Two-dimensional data have attributes for specifying densities of process colors and a special color for each pixel of a 2D image. The attributes for specifying densities of the process colors and a special color are set in the form of, for example, 8-bit pixel values (0 to 255) of the respective colors for each pixel of a 2D image.

Thus, at step S20A, the attribute setting unit 41 sets heights of a medium-born modeled object Q to be manufactured using the attribute (special color density attribute) for specifying densities of a special color. More specifically, the attribute setting unit 41 sets, at a pixel value corresponding to a height, the special color density of each of pixels located at positions where the 2D image data are given a height by height information.

For example, the corresponding relationship between heights and pixel values may be stored in the nonvolatile memory 30D in advance, like "pixel value "1"=1 mm." Any value may be set as a height corresponding to a pixel value "1."

The attribute setting unit 41 may set, at the sum of a pixel value corresponding to a height and a predetermined pixel value, the special color density of each of pixels located at positions where the 2D image data are given a height by height information. The predetermined pixel value is a value that specifies a minimum height of a medium-born modeled object Q and is called an offset. Setting, as the offset, a minimum height that allows human vision or tactility to recognize a swell from a recording medium 50 makes it possible to recognize a medium-born modeled object Q more easily than in the case of not using the offset, and hence is suitable for modeling of a braille panel.

Correlating pixel values with heights directly is not the only way of setting the heights. For example, pixel values may be correlated with the numbers of recording media 50 to be stacked, like "pixel value "1"=1 (recording medium)."

The corresponding relationship between heights and pixel values need not always be stored in the nonvolatile memory 30D in advance, and may be specified by a user through the operation unit 32. In this case, the attribute setting unit 41 sets special color densities by referring to a user-specified corresponding relationship between heights and pixel values. Information indicating a corresponding relationship between heights of a medium-born modeled object Q and pixel values is an example of the "correspondence information".

Modification 1

Although in the second exemplary embodiment heights of a medium-born modeled object Q are set using the special color density attribute, among applications for generating 2D image data to be input to the information processing apparatus 10 are ones that do not assume use of special colors. Two-dimensional image data that are generated by an application that does not assume use of special colors may be such as not to have a special color density attribute.

In such a case, at step S20A of the information processing program shown in FIG. 12, the attribute setting unit 41 sets heights of a medium-born modeled object Q using the attributes for specifying densities of process colors instead of the special color density attribute.

For example, heights are correlated in advance with specified colors each of which is expressed by a combination of process color densities, and the attribute setting unit 41 sets, for each pixel, a pixel value that means a specified color corresponding to a specified height. Assume that, for example, a height "10 mm" is correlated with a combination "(cyan density)=0, (magenta density)=0, (yellow density)= 0, and (black density)=100." If a height "10 mm" is designated in this case, the attribute setting unit 41 sets the process color densities of each of pixels located at positions where the height "10 mm" is designated to "(cyan density)=0, (magenta density)=0, (yellow density)=0, and (black density)=100."

If black is expressed by a combination of process colors C, M, and Y (what is called process black), it becomes possible to express heights of a medium-born modeled object Q using black. Where particular process color combinations are used for specifying heights of a medium-born modeled object Q, these process color combinations may not be used for ordinary printing of 2D image data. This limitation may be avoided by using the process black density as an attribute for setting heights.

There are no limitations on the correspondence between combinations of process color densities and heights. For example, a height "10 mm" may be correlated with either "(cyan density)=0" or "(cyan density)=0 and (magenta density)=0."

Modification 2

Although in the second exemplary embodiment and the first modification heights of a medium-born modeled object Q are set according to specified height information, the attribute setting unit 41 may correct heights of a medium-born modeled object Q and set special color densities or sets of process color densities according to corrected heights of the medium-born modeled object Q.

When a rounding processing instruction is received, for example, from an application or from a user through the operation unit 32, the attribute setting unit 41 corrects heights of a medium-born modeled object Q at step S20A of the information processing program shown in FIG. 12.

More specifically, the attribute setting unit 41 extracts apices of the medium-born modeled object Q that is expressed by the height information and determines a curve that approximates an outline of the medium-born modeled object Q by applying an interpolation technique such as spline interpolation to the extracted apices.

Figure 13:
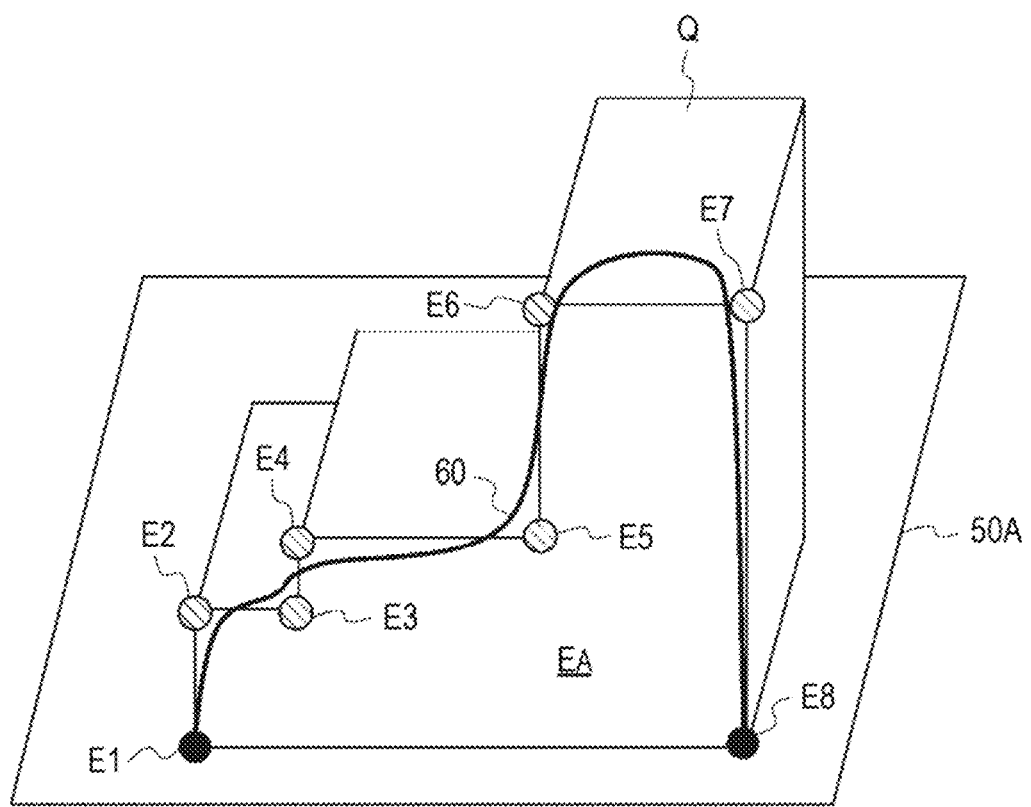
FIG. 13 illustrates an example of how rounding processing is performed on a medium-born modeled object.

FIG. 13 illustrates an example of how rounding processing is performed on a medium-born modeled object Q. In FIG. 13, apices of a side surface $E_A$ of a medium-born modeled object Q to be subjected to rounding processing are denoted by respective symbols E1-E8. By performing rounding processing, a curve 60 is determined that approximates the outline of the side surface $E_A$. In this manner, an approximate curve of each outline of a medium-born modeled object Q may be determined by determining a curve that approximates straight lines that connect apices of the medium-born modeled object Q to be subjected to rounding processing.

The attribute setting unit 41 sets special color densities or process color densities at pixel values corresponding to curve-approximated heights of each outline of the medium-born modeled object Q.

An instruction indicating the degree of approximation, using a curve, of each outline of a medium-born modeled object Q may be received from a user through the operation unit 32. The degree of approximation is an index indicating the degree of smoothness of surfaces of a medium-born modeled object Q. As the specified degree of approximation becomes higher, radii of curvature of a curve that approximates an outline of a medium-born modeled object Q increase, whereby the degree of undulation of surfaces of the medium-born modeled object Q is made lower, that is, the surfaces of the medium-born modeled object Q are made smoother.

As described above, in the 3D modeling systems according to the second exemplary embodiment and its modifications, a special color density attribute or process color density attributes that are prepared in advance for formation of a 2D image are used as the modeling attribute(s), whereby a medium-born modeled object Q may be formed on a base recording medium 50A by a process that is equivalent to a process for forming 2D images on respective recording media 50.

Exemplary Embodiment 3

In the 3D modeling systems according to the second exemplary embodiment and its modifications, a medium-born modeled object Q is manufactured using a special color density attribute or process color density attributes as the modeling attribute(s), a third exemplary embodiment is directed to a 3D modeling system that is the same as the 3D modeling systems according to the second exemplary embodiment and its modifications in using a special color density attribute or process color density attributes as the modeling attribute(s) and is different from the latter in changing heights corresponding to special color densities or sets of process color densities by referring to a height conversion table that is registered in advance.

The configuration of the 3D modeling system according to the third exemplary embodiment is equivalent to the configuration shown in FIGS. 1A and 1B, and the functional configuration, relating to manufacture of a medium-born modeled object Q, of the information processing apparatus 10 according to the third exemplary embodiment is equivalent to that shown in FIG. 9.

<Information Processing Program>

Next, an information processing program according to the third exemplary embodiment will be described.

Figure 14:
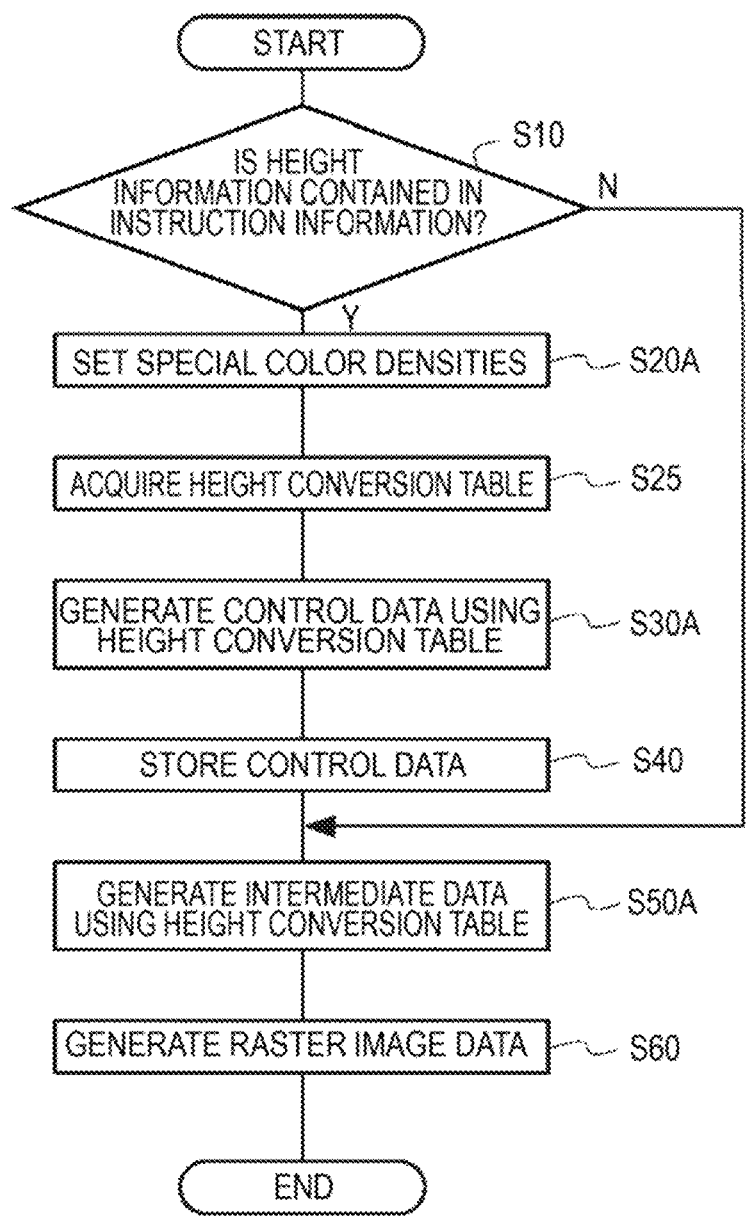
FIG. 14 is a flowchart showing an example processing procedure of an information processing program according to a third exemplary embodiment.

FIG. 14 is a flowchart showing an example processing procedure of the information processing program according to the third exemplary embodiment. The information processing program is stored in the ROM 30B of the information processing apparatus 10. The information processing program is read out from the ROM 30B and executed by the CPU 30A of the information processing apparatus 10 upon reception of a 2D image formation instruction from a user.

The following description will be made with an assumption that 2D image data accommodate special colors but no special colors are used in 2D images. Although the following description will be directed to a case that a special color density attribute is used as the modeling attribute, it goes without saying that process color density attributes may be used in place of the special color density attribute.

The information processing program shown in FIG. 14 is different from that according to the second exemplary embodiment shown in FIG. 12 in that the former is added with step S25 and employs steps S30A and S50A in place of steps S30 and S50 of the latter, respectively. Thus, steps S25, S30A, and S50A will be described below.

Figure 15:
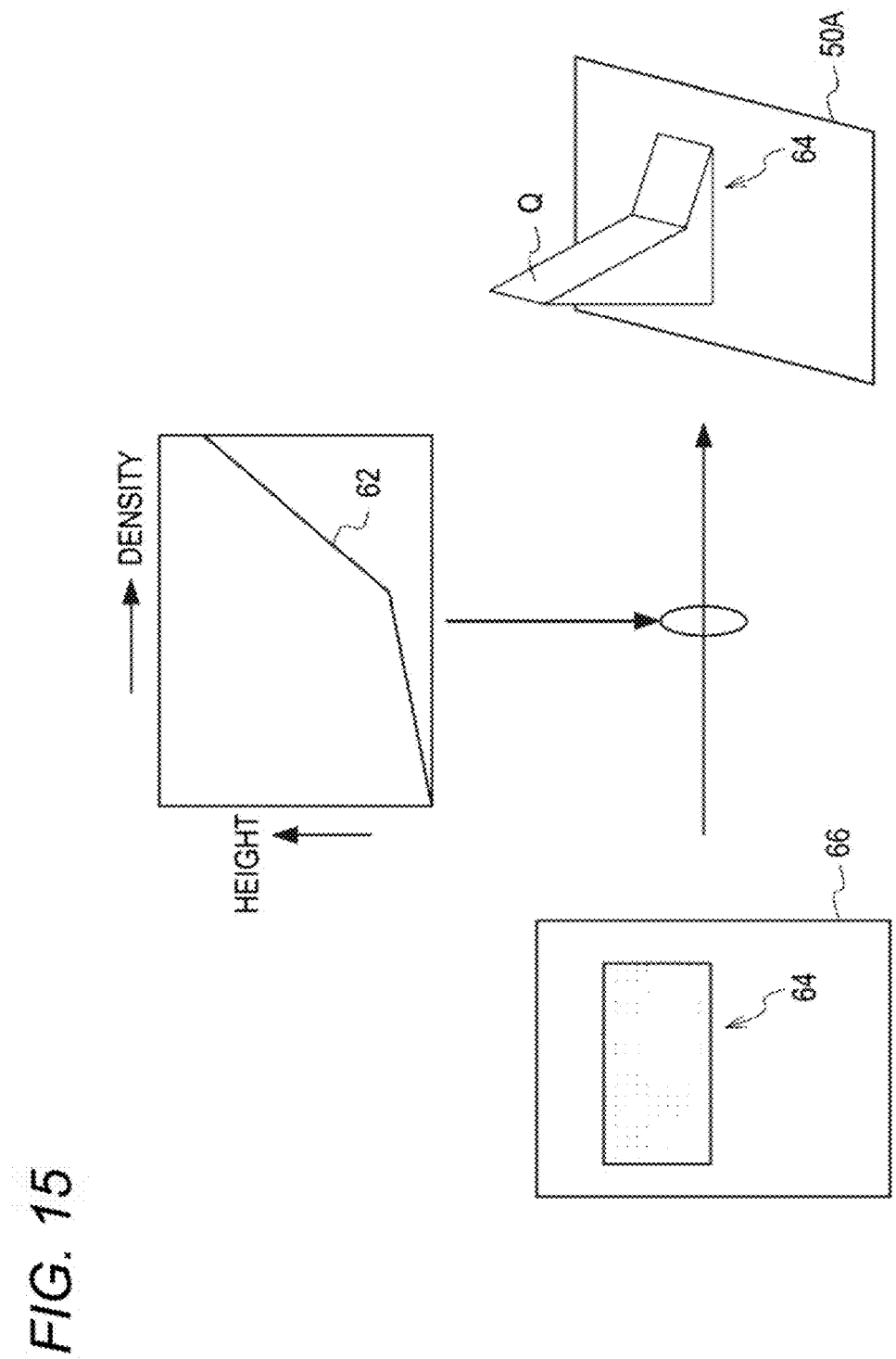
FIG. 15 is a schematic diagram illustrating how a table indicating a corresponding relationship between densities and heights of a medium-born modeled object is used.

At step S25, the attribute setting unit 41 acquires a height conversion table that is stored in, for example, the nonvolatile memory 30D in advance. As shown in FIG. 15, the height conversion table is a table that is represented by a curve 62 in a graph in which the horizontal axis and the vertical axis represent the density and the height of a medium-born modeled object Q, respectively, and hence shows a corresponding relationship between densities and heights of the medium-born modeled object Q.

At step S30A, the attribute setting unit 41 sets, as heights at the positions of pixels, heights corresponding to special color densities of the respective pixels that are obtained from the height conversion table acquired at step S25. The control data generation unit 44 generates control data that specify the numbers of recording media 50 to be laminated together and cutting lines 54 and glue application regions 58 in respective recording media 50.

At step S50A, the file format conversion unit 42 determines the numbers of recording media 50 to be stacked by referring to the heights corresponding to the special color densities of the respective pixels that are obtained from the height conversion table acquired at step S25, and generates intermediate data corresponding to respective recording media 50 to be stacked.

With the above processing procedure, where as shown in FIG. 15 the special color density of 2D image data 66 varies continuously from "0" to "255" in a region 64 (what is called a gradation image), a medium-born modeled object Q whose top surfaces are inclined in the same manner as the curve 62 of the height conversion table is manufactured on a region 64 of a base recording medium 50A.

Figure 16:
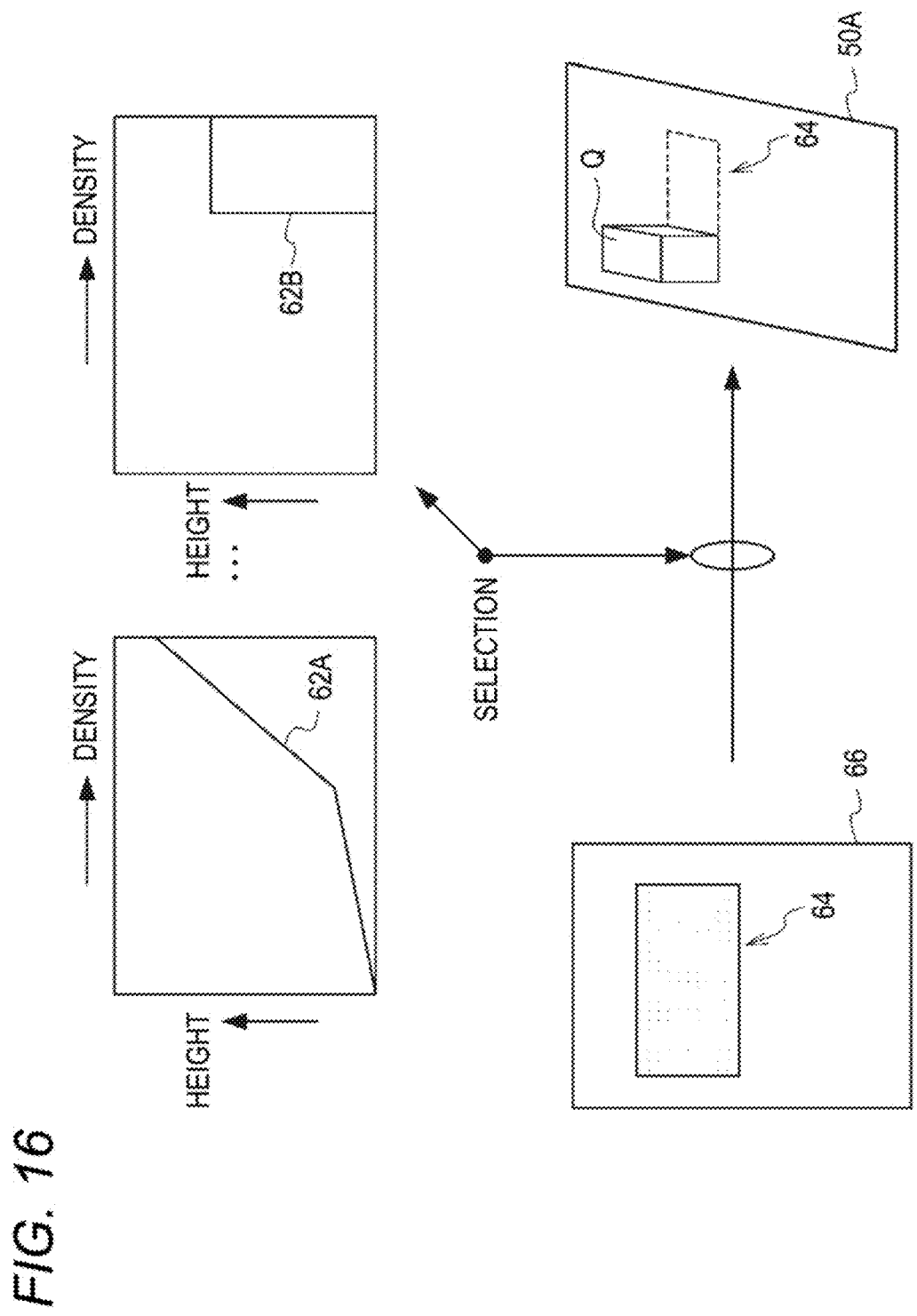
FIG. 16 is a schematic diagram illustrating how plural tables each indicating a corresponding relationship between densities and heights of a medium-born modeled object are used.

Plural height conversion tables may be registered in the nonvolatile memory 30D, in which case as shown in FIG. 16 a user selects a height conversion table to be used through the operation unit 32.

In the example shown in FIG. 16, curves 62A and 62B are registered in the nonvolatile memory BOD as height conversion tables and the height conversion table corresponding to the curve 62B has been selected by a user. Where special color densities of 2D image data 66 in a region 64 are of a gradation image, as shown in FIG. 16 a cuboid-shaped medium-born modeled object Q is manufactured according to the curve 62B on a region 64 of a base recording medium 50A.

As in the second modification of the second exemplary embodiment, when a rounding processing instruction is received, for example, from an application or from a user through the operation unit 32, the attribute setting unit 41 may set, as special color densities, pixel values corresponding to heights of a medium-born modeled object Q that are indicated by curves that approximate its outlines at step S20A shown in FIG. 14. The attribute setting unit 41 may set special color densities using an offset.

As described above, in the 3D modeling system according to the third exemplary embodiment, special color densities or sets of process color densities are converted into heights of a medium-born modeled object Q using the height conversion table. This makes it possible to manufacture different medium-born modeled objects Q by switching the height conversion table.

Exemplary Embodiment 4

A fourth exemplary embodiment is directed to a 3D modeling system for manufacturing a medium-born, modeled object Q by adding a height specifying page(s) that specifies heights of the medium-born modeled object Q to 2D image data that are input to the information processing apparatus 10.

The configuration of the 3D modeling system according to the fourth exemplary embodiment is equivalent to the configuration shown in FIGS. 1A and 1B, and the functional configuration, relating to manufacture of a medium-born modeled object Q, of the information processing apparatus 10 according to the fourth exemplary embodiment is equivalent to that shown in FIG. 9.

<Information Processing Program>

Next, an information processing program according to the fourth exemplary embodiment will be described.

Figure 17:
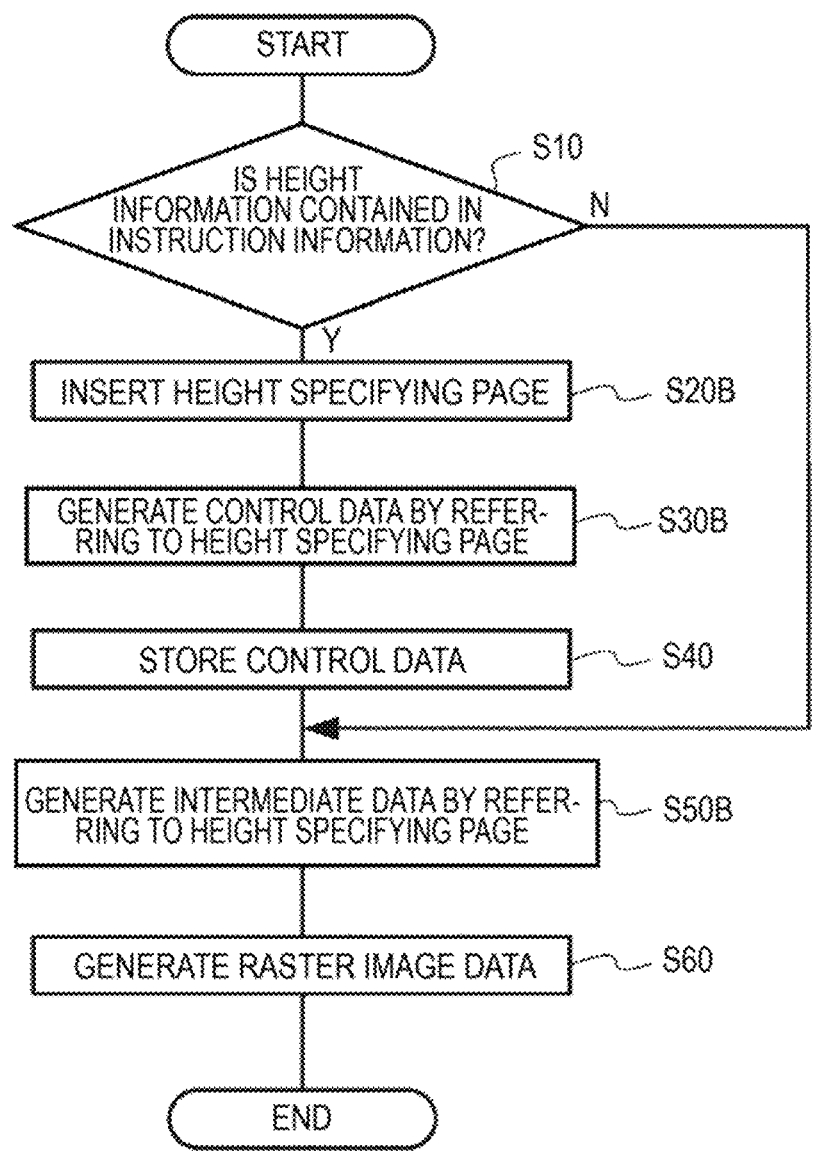
FIG. 17 is a flowchart showing an example processing procedure of an information processing program according to a fourth exemplary embodiment.

FIG. 17 is a flowchart showing an example processing procedure of the information processing program according to the fourth exemplary embodiment. The information processing program is stored in the ROM 30B of the information processing apparatus 10. The information processing program is read out from the ROM 30B and executed by the CPU 30A of the information processing apparatus 10 upon reception of a 2D image formation instruction from a user.

Although the following description will be directed to a case that a special color density attribute is used as the modeling attribute, it goes without saying that process color density attributes may be used in place of the special color density attribute.

The information processing program shown in FIG. 17 is different from that according to the first exemplary embodiment shown in FIG. 10 in that the former employs steps S20B, S30B, and S50B in place of steps S20, S30, and S50 of the latter, respectively. Thus, steps S20B, S30B, and S50B will be described below.

At step S20B, the attribute setting unit 41 generates a height specifying page in which special color densities of pixels located at positions where 2D image data are given a height by height information by, for example, referring to a corresponding relationship between heights of a medium-born modeled object Q and pixel values. That is, the height specifying page is 2D image data of a PDL data format in which heights of a medium-born modeled object Q at respective positions are specified in the form of predetermined special color densities.

The attribute setting unit 41 inserts the generated height specifying page before pages of 2D image data (base 2D image data) that have been input to the information processing apparatus 10.

The corresponding relationship between heights and pixel values to be referred to in generating a height specifying page may be either one that is stored in the nonvolatile memory 300 in advance or one that is designated by a user through the operation unit 32. The attribute setting unit 41 may set special color densities using an offset.

At step S30B, by referring to the height specifying page inserted at step S20B, the control data generation unit 44 generates control data that specify the numbers of recording media 50 to be laminated together and cutting lines 54 and glue application regions 58 in the respective recording media 50 on the basis of the heights, indicated by the special color densities, of the medium-born modeled object Q to be manufactured.

At step S50B, the file format conversion unit 42 determines the numbers of recording media 50 on which 2D images represented by the base 2D image data are to be formed and that are to be stacked on a base recording medium 50A by referring to the height specifying page inserted at step S20B, and generates intermediate data corresponding to respective recording media 50 to be stacked. In doing so, the file format conversion unit 42 does not convert the height specifying page to intermediate data. Thus, the height specifying page is not printed on a recording medium 50 by the image forming apparatus 12 and a medium-born modeled object Q corresponding to the base 2D image data are manufactured.

Figure 18A:
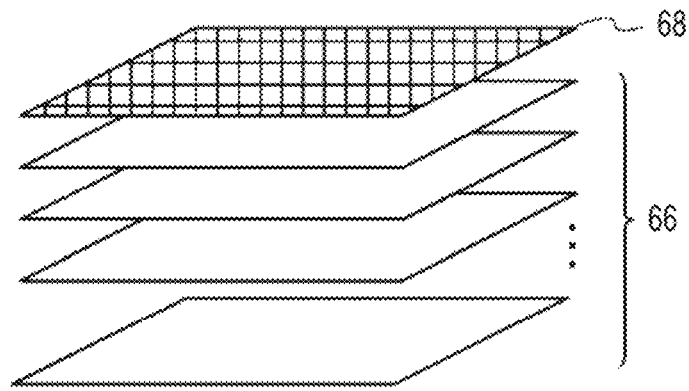
FIGS. 18A and 18B are schematic diagrams illustrating a page or pages to which a height specifying page is applied.

When 2D image data of plural pages are received by the information processing apparatus 10, if the 2D image data of all of the pages contain the same height information, as shown in FIG. 18A the attribute setting unit 41 inserts a height specifying page 88 before the head 2D image data 66. That is, the height specifying page 68 which is the first page indicates heights of 2D image data 66 of each of the second and ensuing pages.

Figure 18B:
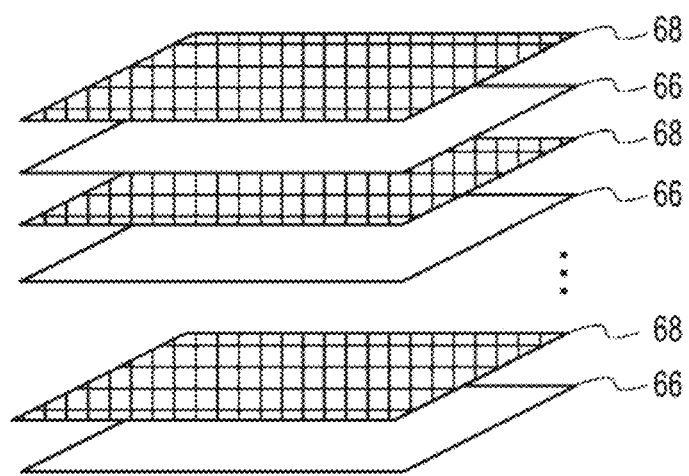

If 2D image data of plural pages contain height information in such a manner that it is distributed in the plural pages, as shown in FIG. 18B the attribute setting unit 41 arrange height specifying pages 68 and pages of 2D image data 66 alternately. More specifically, the height specifying page 68 that is the first page specifies heights of the second-page 2D image data 66 and the height specifying page 68 that is the third page specifies heights of the fourth-page 2D image data 66.

The manner of arrangement of height specifying pages is not limited to the above; it suffices to set a height specifying page 68 immediately before a page(s) of 2D image data to which the height information concerned is to be applied.

The file format conversion unit 42 refers to 2D image data received by the attribute setting unit 41 in order from the head page. The file format conversion unit 42 determines the number of recording media 50 on which 2D images represented by the 2D image data are to be formed and that are to be stacked on a base recording medium 50A using a height specifying page referred to most recently until the next height specifying page appears, and generates intermediate data corresponding to the respective recording media 50 to be stacked.

Although in the fourth exemplary embodiment, a height specifying page is generated by the information processing apparatus 10, a height specifying page may be generated by an external terminal such as a computer that sends 2D image data to the information processing apparatus 10 and inserted before or in the 2D image data.

As in the second modification of the second exemplary embodiment, when a rounding processing instruction is received, for example, from an application or from a user through the operation unit 32, the attribute setting unit 41 may set, as special color densities of a height specifying page, pixel values corresponding to heights of a medium-born modeled object Q that are indicated by curves that approximate its outlines at step S20B shown in FIG. 17.

As described above, the 3D modeling system according to the fourth exemplary embodiment manufactures a medium-born modeled object Q by setting heights of the medium-born modeled object Q using a height specifying page.

Although an aspect of the invention has been described in the form of the exemplary embodiments, the invention is not limited to these exemplary embodiments. A variety of changes or improvements can be made in the exemplary embodiments without departing from the spirit and scope of the invention, and the technical scope of the invention encompasses modes including such changes or improvements. For example, the order of steps may be changed without departing from the spirit and scope of the invention.

In each exemplary embodiment, the steps of the image processing program shown in FIG. 10, 12, 14, or 17 are implemented by software, each step may be implemented by hardware, in which case the processing speed may be made higher than in the case that the steps are implemented by software.

Although in each exemplary embodiment the image processing program is installed in the ROM 30B, the invention is not limited to this case. The image processing program according to the invention may be provided in such a form as to be stored in a computer-readable storage medium. For example, the image processing program according to the invention may be provided in such a form as to be stored in an optical disc such as a CD (compact disc)-ROM or a DVD (digital versatile disc) or a portable storage medium such as a USB memory or a memory card. Where the information processing apparatus 10 is connected to a communication line via the communication unit 36, the image processing program according to the invention may be acquired over the communication line.

What is claimed is:

1. An information processing apparatus comprising:
   a setting unit that sets, as an attribute to be used for manufacture of a 3D modeled object, an attribute of a 2D image to be used for forming the 2D image on a recording medium, when the 3D modeled object is manufactured by laminating recording media together, wherein the setting unit sets the attribute of the 2D image so as to determine a curve that approximates an outline of the 3D modeled object; and
   a specifying unit that specifies the degree of approximation, using the curve, of the outline of the 3D modeled object,
   wherein the setting unit sets the attribute of the 2D image so as to determine, as the curve that approximates the outline of the 3D modeled object, a curve having larger radii of curvature as the degree of approximation specified by the specifying unit becomes higher.

2. The information processing apparatus according to claim 1, wherein the attribute of the 2D image is a pixel value that specifies a density of a predetermined color, and the setting unit sets a shape of the 3D modeled object using pixel values of the attribute.

3. The information processing apparatus according to claim 2, wherein the setting unit sets heights of the 3D modeled object at positions of pixels of the 2D image using pixel values of the pixels, respectively.

4. The information processing apparatus according to claim 3, further comprising a conversion unit that converts the pixel values of the pixels of the 2D image into heights of the 3D modeled object at the positions of the pixels, respectively, by referring to correspondence information that correlates pixel values with heights of a 3D modeled object.

5. The information processing apparatus according to claim 4, further comprising a specifying unit that designates one of plural pieces of correspondence information registered in advance,
   wherein the conversion unit converts the pixel values of the pixels of the 2D image into heights of the 3D modeled object at the positions of the pixels, respectively, by referring to the correspondence information designated by the specifying unit.

6. The information processing apparatus according to claim 3, further comprising a specifying unit that specifies heights of the 3D modeled object for pixel values corresponding to respective predetermined colors,
   wherein the setting unit sets heights of the 3D modeled object at the positions of the pixels of the 2D image using the pixel values of the pixels, respectively, by referring to the heights of the 3D modeled object specified by the specifying unit.

7. The information processing apparatus according to claim 6, wherein the specifying unit specifying heights of the 3D modeled object in the form of the number of recording media or in units of a physical quantity representing length.

8. The information processing apparatus according to claim 2, wherein the predetermined color is a designated special color that is not any of fundamental colors that are cyan, magenta, yellow, and black.

9. The information processing apparatus according to claim 2, wherein the predetermined color is at least one of fundamental colors that are cyan, magenta, yellow, and black.

10. The information processing apparatus according to claim 1, wherein the setting unit sets an application range of the attribute to be used for manufacture of the 3D modeled object in units of one recording medium.

11. The information processing apparatus according to claim 2, wherein the setting unit sets an application range of the attribute to be used for manufacture of the 3D modeled object in units of one recording medium.

12. The information processing apparatus according to claim 3, wherein the setting unit sets an application range of the attribute to be used for manufacture of the 3D modeled object in units of one recording medium.

13. A 3D modeling system comprising:
   the information processing apparatus according to claim 1;
   an image forming apparatus that forms lamination images on respective recording media on the basis of image formation information; and
   a 3D modeling post-processing apparatus that performs 3D modeling post-processing for manufacture of a 3D modeled object on the recording media on which the lamination images have been formed, according to control data for the lamination images.

14. A non-transitory computer readable medium storing a program causing a computer to execute a process for information processing, the process comprising:
   setting, as an attribute to be used for manufacture of a 3D modeled object, an attribute of a 2D image to be used for forming the 2D image on a recording medium, when the 3D modeled object is manufactured by laminating recording media together, wherein the attribute of the 2D image is set so as to determine a curve that approximates an outline of the 3D modeled object; and
   specifying the degree of approximation, using the curve, of the outline of the 3D modeled object,
   wherein the attribute of the 2D image is set so as to determine, as the curve that approximates the outline of the 3D modeled object, a curve having larger radii of curvature as the degree of approximation specified becomes higher.

* * * * *